(12) United States Patent
Fear

(10) Patent No.: US 12,492,913 B2
(45) Date of Patent: Dec. 9, 2025

(54) AUTOMATIC GRAPHICAL CONTENT RECOGNITION FOR VEHICLE APPLICATIONS

(71) Applicant: NVIDIA Corporation, Santa Clara, CA (US)

(72) Inventor: Andrew Fear, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/343,922

(22) Filed: Jun. 29, 2023

(65) Prior Publication Data
US 2023/0341235 A1 Oct. 26, 2023

Related U.S. Application Data

(63) Continuation of application No. 17/098,094, filed on Nov. 13, 2020, now Pat. No. 11,725,959.

(51) Int. Cl.
*G06F 3/048* (2013.01)
*G01C 21/36* (2006.01)

(52) U.S. Cl.
CPC ..... *G01C 21/3664* (2013.01); *G01C 21/3682* (2013.01)

(58) Field of Classification Search
CPC .............. G01C 21/3664; G01C 21/3682
See application file for complete search history.

(56) References Cited

U.S. PATENT DOCUMENTS

| | | | |
|---|---|---|---|
| 8,566,020 B2 | 10/2013 | Arrasvuori | |
| 9,417,088 B2 * | 8/2016 | Ichinokawa | G01C 21/3682 |
| 9,703,385 B2 * | 7/2017 | Khosravy | G06Q 30/02 |
| 9,903,731 B2 | 2/2018 | Fischer et al. | |
| 10,242,457 B1 | 3/2019 | Sibley | |
| 10,535,180 B2 | 1/2020 | Dai et al. | |
| 10,732,004 B2 * | 8/2020 | Jung | G06F 16/29 |
| 10,885,698 B2 | 1/2021 | Muthler et al. | |
| 11,137,263 B2 * | 10/2021 | Efland | G01C 21/20 |
| 11,256,758 B2 | 2/2022 | Jin et al. | |
| 11,346,682 B2 | 5/2022 | Fasola et al. | |
| 11,604,557 B2 * | 3/2023 | Dayde | G06F 3/04815 |
| 11,609,625 B2 * | 3/2023 | Johnson | G06T 7/60 |
| 11,610,376 B1 * | 3/2023 | Smith | G06F 3/016 |

(Continued)

OTHER PUBLICATIONS

Fear, Andrew; Final Office Action for U.S. Appl. No. 17/098,094, filed Nov. 13, 2020, mailed Sep. 20, 2022, 15 pgs.

(Continued)

*Primary Examiner* — David Phantana-angkool
(74) *Attorney, Agent, or Firm* — Iron Summit IP LLP

(57) ABSTRACT

In various examples, a gaze direction of a user's eyes may be tracked and synced with perception data of the vehicle to determine POIs that the user is interested in. In some examples, POIs may be stored as waypoints in a waypoint catalog or store and included as part of a map. As a user is driving in a vehicle down a roadway, a system onboard the vehicle may access the map to determine locations of the vehicle, and may reference the waypoint catalog to determine the POIs that the vehicle passes. Using an advertiser name, contact information, an advertisement image, advertiser website information, links to additional content, etc. relating to each waypoint, a log of the passed POIs may be stored for access by the user.

20 Claims, 13 Drawing Sheets

(56) References Cited

U.S. PATENT DOCUMENTS

| | | | | |
|---|---|---|---|---|
| 11,625,103 | B2* | 4/2023 | Schoen | G06F 3/0304 |
| | | | | 345/157 |
| 11,637,999 | B1* | 4/2023 | Tichenor | G02B 27/0172 |
| | | | | 345/633 |
| 11,725,959 | B2 | 8/2023 | Fear | |
| 11,907,434 | B2* | 2/2024 | Shimizu | H04N 13/344 |
| 2010/0146460 | A1* | 6/2010 | Dunko | G06F 3/04886 |
| | | | | 715/863 |
| 2011/0035143 | A1* | 2/2011 | Lee | G06Q 10/06 |
| | | | | 715/702 |
| 2016/0061622 | A1 | 3/2016 | Ren et al. | |
| 2016/0350982 | A1 | 12/2016 | Lindberg et al. | |
| 2018/0005434 | A1* | 1/2018 | Ren | G06T 15/205 |
| 2018/0079427 | A1 | 3/2018 | Herz et al. | |
| 2019/0137294 | A1* | 5/2019 | Jung | G01C 21/3867 |
| 2019/0392643 | A1 | 12/2019 | Busto et al. | |
| 2020/0309557 | A1* | 10/2020 | Efland | G06V 20/20 |
| 2021/0090331 | A1* | 3/2021 | Ravasz | G06T 19/20 |
| 2021/0231455 | A1* | 7/2021 | Nguyen | G01C 21/3811 |
| 2021/0390305 | A1* | 12/2021 | MacWilliams | G06N 3/02 |
| 2022/0121867 | A1 | 4/2022 | Arar et al. | |
| 2022/0250624 | A1 | 8/2022 | Park et al. | |
| 2022/0262046 | A1 | 8/2022 | An et al. | |

OTHER PUBLICATIONS

IEC 61508, "Functional Safety of Electrical/Electronic/Programmable Electronic Safety-related Systems," https://en.wikipedia.org/wiki/IEC_61508, accessed on Apr. 1, 2022, 7 pgs.

ISO 26262, "Road vehicle—Functional safety," International standard for functional safety of electronic system, https://en.wikipedia.org/wiki/ISO_26262, accessed on Sep. 13, 2021, 8 pgs.

Fear, Andrew: First Action Interview Office Action Summary for U.S. Appl. No. 17/098,094, filed Nov. 13, 2020, mailed Dec. 21, 2022, 4 pgs.

"Taxonomy and Definitions for Terms Related to Driving Automation Systems for On-Road Motor Vehicles", Society of Automotive Engineers (SAE), Standard No. J3016-201609, pp. 30 (Sep. 30, 2016).

"Taxonomy and Definitions for Terms Related to Driving Automation Systems for On-Road Motor Vehicles", Society of Automotive Engineers (SAE), Standard No. J3016-201806, pp. 35 (Jun. 15, 2018).

Fear, Andrew; Notice of Allowance for U.S. Appl. No. 17/098,094, filed Nov. 13, 2020, mailed Mar. 24, 2023, 6 pgs.

\* cited by examiner

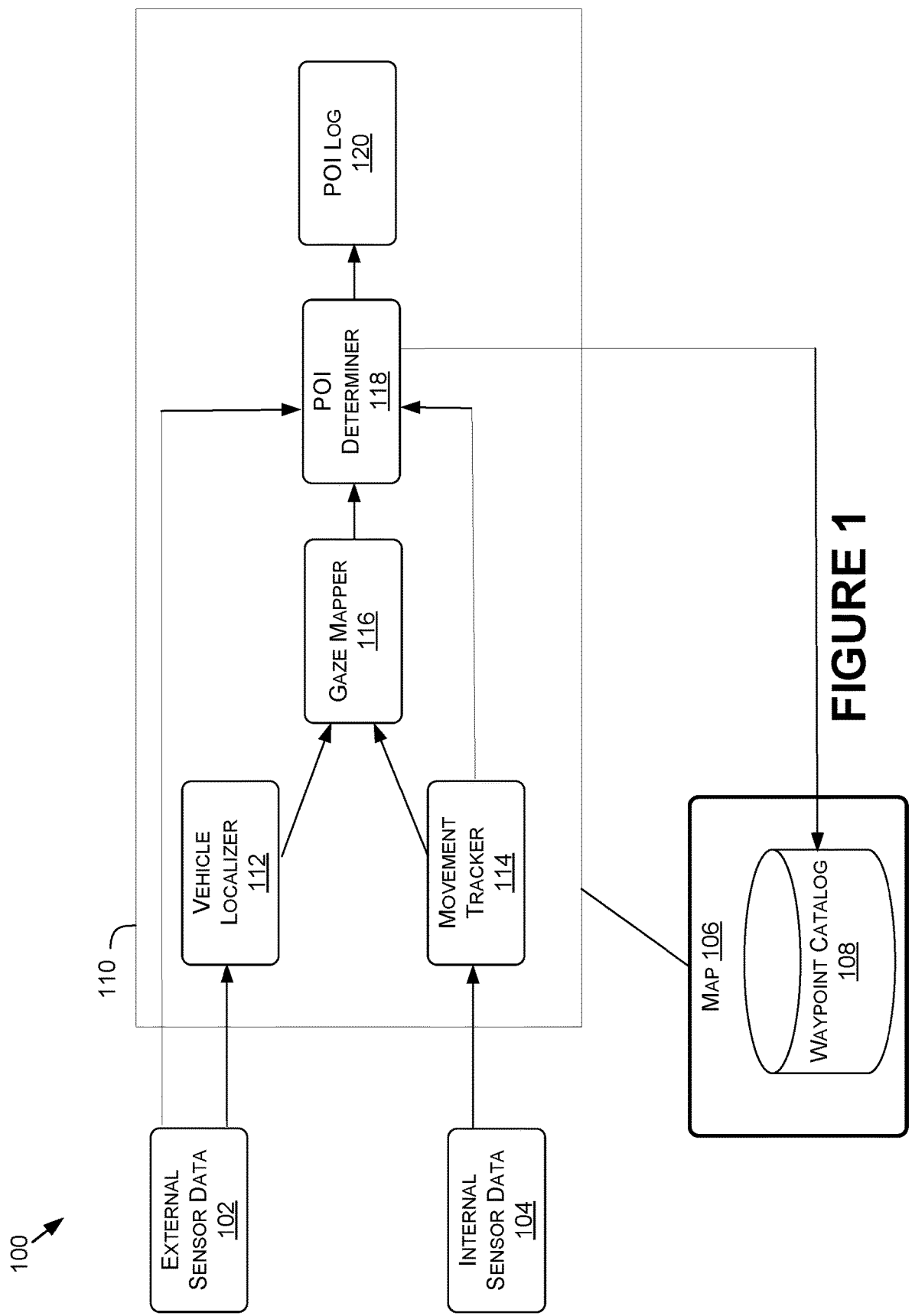

AUTOMATIC GRAPHICAL CONTENT RECOGNITION FOR VEHICLE APPLICATIONS

CROSS-REFERENCE TO RELATED APPLICATIONS

This application is a continuation of U.S. patent application Ser. No. 17/098,094, filed Nov. 13, 2020, which is incorporated herein by reference in its entirety.

BACKGROUND

Occupants (e.g., drivers and/or passengers) of vehicles often pass points of interest (POIs)— such as an advertisement on a billboard—that include information the occupants would like to remember for use at a later time. For example, a billboard advertisement for an insurance company may include a website or a phone number for the user to contact the insurance company for an insurance quote. While driving, it may be unsafe for the user to call the insurance company, access the insurance company's website, write down the information, or take a picture of the billboard. Thus, to capture the information for later use, the occupant must try to remember the contact information, have another passenger in the car record the information, or revisit the location of the billboard. However, the other occupants—if any—may not have seen or remembered the information, or the driver may not desire to drive past the POI again to attempt to remember or record the information. As such, even though billboards or other on-road advertisements are prevalent, their effect on advertising is diminished due to the difficulties of vehicle occupants to remember or keep track of the advertising materials.

SUMMARY

Embodiments of the present disclosure relate to interactive out of home advertising while driving. Systems and methods are disclosed that determine a point of interest (POI) based on gaze information of a user and/or a location of a vehicle.

In contrast to conventional systems, such as those described above, the present system determines a POI—such as an advertisement on a billboard, sign on a building, or other content item—detected by and/or passed by the vehicle. For example, a gaze direction of a user's eyes may be tracked and synced with perception data of the vehicle—e.g., using one or more camera sensors of the vehicle—to determine POIs that the user is interested in. In some examples, POIs may be stored as waypoints in a waypoint catalog or stored and included as part of a map (e.g., a global navigation satellite systems (GNSS) map, a high definition (HD) map, etc.). As a user is driving in a vehicle down a roadway, a system onboard the vehicle may access the map to determine locations of the vehicle, and may reference the waypoint catalog to determine the POIs that the vehicle passes. A log of the passed POIs may be stored for later access by the user, with the log including, for example and without limitation, information such as an advertiser name, the contact information, advertisement image (e.g., as determined using perception of the vehicle or as stored in the catalog), advertiser website information, and/or links to additional content, etc. relating to each waypoint. In some embodiments, a combination of the gaze direction and the catalog may be used, such that information related to the POIs that the user gazed at may be stored or marked for the user for later review. As a result, information determined from these POIs or waypoints may be stored for later access by the occupant of the vehicle, thereby increasing the efficacy of advertising and/or other content types on roadways.

BRIEF DESCRIPTION OF THE DRAWINGS

The present systems and methods for interactive out of home advertising while driving are described in detail below with reference to the attached drawing figures, wherein:

FIG. 1 is an example process 100 for determining a point of interest (POI), in accordance with some embodiments of the present disclosure;

DETAILED DESCRIPTION

Figure 2B:
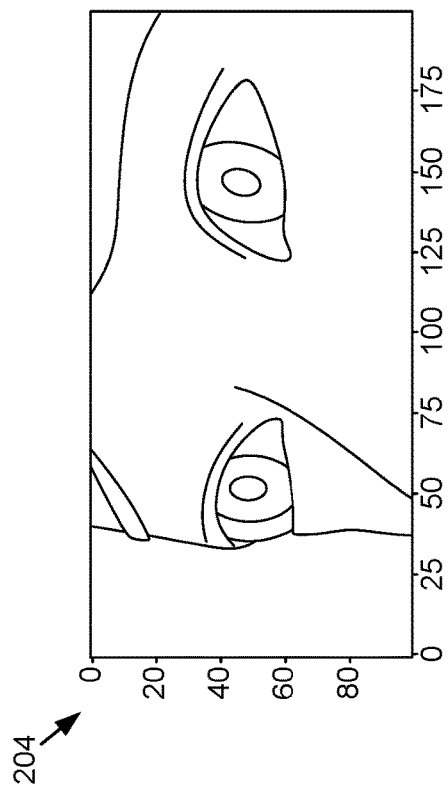
FIGS. 2B-2C depict example illustrations of eye locations at a time step or frame used for determining eye movement information, in accordance with some embodiments of the present disclosure.

Systems and methods are disclosed related to interactive out of home advertising while driving. Although the present disclosure may be described with respect to an example autonomous vehicle 600 (alternatively referred to herein as "vehicle 600" or "ego-vehicle 600," an example of which is described herein with respect to FIGS. 6A-6D), this is not intended to be limiting. For example, the systems and methods described herein may be used by non-autonomous vehicles, semi-autonomous vehicles (e.g., in one or more advanced driver assistance systems (ADAS)), robots, warehouse vehicles, off-road vehicles, flying vessels, boats, and/or other vehicle types. In addition, although the present disclosure may be described with respect to driving, this is not intended to be limiting. For example, the systems and methods described herein may be used in robotics, aerial systems, boating systems (e.g., emergency watercraft identification), simulation environments (e.g., emergency response vehicle detection of virtual vehicles within a virtual simulation environment), and/or other technology areas. Further, although the present disclosure may be described with respect to occupants in a vehicle, this is not intended to be limiting. For example, the systems and methods described herein may be used in augmented reality systems, virtual reality systems, mixed reality systems, and/or other technology areas.

In some embodiments, as a user is traveling in a vehicle along a roadway, a system onboard the vehicle may reference a waypoint catalog to determine points of interest (POIs)— such as an advertisement on a billboard, sign on a building, or other physical content item—within the field of view of the user that the vehicle passes and/or approaches. POIs may be stored as waypoints in a waypoint catalog and/or stored and included as part of a map (e.g., a global navigation satellite systems (GNSS) map, a high definition (HD) map, etc.). In some embodiments, a waypoint may correspond to a virtual marker corresponding to a POI. Each waypoint may correspond to a location within the map and may be associated with an advertiser name, advertiser contact information, an advertisement image (e.g., as determined using perception of the vehicle 600 or as stored in the catalog), advertiser website information, links to additional content, etc. relating to each POI. Further, POI content corresponding to each waypoint may vary depending on a viewing direction. For example, a user traveling north on a roadway may view different content on a billboard than a user traveling south who views the same billboard.

In some embodiments, the waypoint catalog may be crowdsourced. For example, as vehicles drive past billboards and other POIs, an external sensor (e.g., camera) may detect these billboards and other POIs, capture an image of the POIs, extract information from the POIs (e.g., via optical character recognition), and store the information in the waypoint catalog along with location data for the POI. The waypoint catalog may then be shared with and relied upon by additional users. As new POIs are built or updated—such as a new billboard or new content on an existing billboard—and detected, information related to the new POIs may be recorded and stored in the waypoint catalog.

Similarly, waypoint information that has been updated—such as with a new advertisement—may also be detected via an external camera. When an updated waypoint is detected, the information stored in the waypoint catalog may be updated accordingly. Further, the user may be alerted to, and provided with, information relating to the new or updated waypoints. For example, the user may receive an updated image of the POI content corresponding to the waypoint, an advertiser name, contact information, words present on the POI, etc.

Additionally or alternatively, the waypoint catalog may be accessed and/or maintained by advertisers. For example, an advertiser may access the catalog of waypoints to input and update information related to a waypoint into the catalog. In some examples, the advertiser may store information in the catalog of waypoints for a POI that may not be visible to a user viewing the POI— such as a link to a video advertisement, a coupon, or a link to a review site—but which may be shared with the user based on the system determining the user has an interest in the POI.

In some embodiments, a point of interest determination system may determine a waypoint corresponding to a POI that a user is viewing based on the location of a vehicle within the map and/or the user's gaze direction. In such embodiments, one or more vehicle sensors—such as, an external camera, a GNSS receiver, an IMU (Inertial Measurement Unit), a vehicle speedometer, LIDAR, RADAR, etc.—may be used by the system to localize the vehicle within the map. For example, the one or more sensors may be used to detect semantic environment landmarks. The semantic environment landmarks may then be matched to features of the map to determine a precise location of the vehicle within the map in real-time.

In some embodiments, one or more internal sensors of the vehicle may be used to capture sensor data for tracking a user's movements, such as eye movements, head movements, and/or hand gestures. This information may be used by the system to determine the attentiveness of the occupant, a gaze direction of the occupant, and/or meaningful gestures of the occupant (e.g., pointing at a POI, etc.). In some embodiments, this information may then be used by the system to project a virtual representation of the occupant(s) gaze to a point or region exterior to the vehicle. For example, an eye tracker may use sensor data from one or more in-cabin cameras, NIR cameras, or sensors, and/or other eye-tracking sensor types to determine the user's gaze direction relative to the vehicle.

Using the location of the vehicle 600 within the map and the user's gaze direction, the gaze direction may then be mapped, in real-time or substantially real-time, to the map to determine POIs the user is looking at while driving along a roadway. The system may compare a virtual representation of a field of view (e.g., extent of the observable world that is seen at any given moment) of the user with the waypoint locations on the map to determine POI(s) the user is viewing or potentially viewing. Each waypoint within the field of view of the user may be considered a candidate waypoint for the user to fixate their gaze. Generally, a user's field of view may be in front of the vehicle in the direction the vehicle is traveling. However, in some examples, an occupant(s) of the vehicle may look behind the vehicle and view a POI behind the vehicle. The system may determine, using the one or more internal sensors, that the user's gaze is directed behind the vehicle and determine a waypoint that overlaps with the user's gaze. As content of a POI may be different depending on a viewing direction, the system may determine the viewing direction of the user and store appropriate corresponding content for the user. Advantageously, by mapping the user's gaze direction to the map, the system may determine that the user is looking at a specific billboard or other POI type.

Based at least in part on mapping the gaze direction of the user to the map, the system may determine which POI the user's gaze is fixated on. For example, where a mapped gaze direction of a user overlaps with a waypoint location in the map, the system may determine that the user is looking at a POI associated with the waypoint at the waypoint location. In some embodiments, the system may log each waypoint the user is determined to have looked at or passed during a drive and provide a summary to the user with each of the waypoints. For example, a user driving to work may pass several billboards during their commute and the system may log information related to each billboard the user looked at for longer than a threshold amount of time (e.g., continuous period of time, cumulative amount of time within a time window, etc.) and present the waypoint information to the user—e.g., when the user arrives at work, when the user accesses an application (e.g., in the vehicle, on their device, etc.), and/or at another time. Advantageously, the user may review and use the information as may be desired. In further embodiments, the waypoints a user looks at during a drive may be recorded and provided to an advertiser. In this way, the advertiser may determine the effectiveness of their advertisements. Users may be provided the ability to opt in to/out of sharing gaze information with advertisers.

In some embodiments, the system may record information related to waypoints a user looked at based on detecting a trigger action—such as a button being actuated, a gesture, a voice command, etc.—from the user. For example, as a user is driving along a roadway, the user may press a button on a steering wheel of the vehicle, provide an input to an application on a mobile device or perform a gesture with their hand to trigger the system to determine a waypoint the user is viewing while the gesture is performed. The determined waypoint may then be recorded and stored in association with the user to be presented to the user at a later time.

In some examples, such as those where the system cannot determine a waypoint associated with a POI that the user is viewing—where no waypoint exists in the map along the path of the user's projected gaze—the system may map the user's gaze direction to a field of view that may be captured by an external camera of the vehicle to determine a POI the user is viewing. For example, if a user is driving past a person on a roadway that is holding an advertisement—such as a poster, board, banner, sign, etc.—there may not be a waypoint stored in the waypoint catalog associated with the advertisement at the location of the person holding the advertisement. In some embodiments, the system may employ an object detection algorithm to determine a bounding box(es) for a POI(s) in the field of view of the user. As such, the user traveling in the vehicle may execute a trigger action while looking at the person holding the advertisement and the system may determine that the user's gaze direction overlaps with a bounding box of a determined POI associated with the person holding the advertisement. Based on the trigger action and determining the user's gaze overlaps with the bounding box of the POI, an external camera may capture an image of the advertisement. The advertisement may then be processed by a computer vision system to extract information from, and related to, the advertisement. This information may then be stored, along with the captured image and location information, in association with the user to be provided to the user at a later time.

With reference to FIG. 1, FIG. 1 is an example process 100 for determining a POI, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

FIG. 1 includes external sensor data 102, internal sensor data 104, map 106, waypoint catalog 108, POI determination system 110, vehicle localizer 112, movement tracker 114, gaze mapper 116, POI determiner 118, and POI log 120.

In operation, the POI determination system 110 may access the map 106. The map 106 may be a global navigation satellite systems (GNSS) map, a high definition (HD) map, another map type capable of providing near 1:1 scaling of a real-world environment, and/or another map type. The map 106 may include and/or have access to the waypoint catalog 108. The waypoint catalog 108 may comprise any number of waypoints, where each waypoint corresponds to a POI in a real-world environment. Additionally, data associated with each POI may be stored in the waypoint catalog 108 in association with each corresponding waypoint. For example, a waypoint entry may include location information, visibility direction (e.g., viewable facing north), an advertiser name, advertiser contact information, an advertisement image (e.g., as determined using the external sensor data 102 or as stored in the catalog), advertiser website information, links to additional content, etc.

The vehicle localizer 112 of the POI determination system 110 may receive the external sensor data 102. The external sensor data 102 may correspond to sensor data generated using one or more external sensors of the vehicle 600, such as one or more cameras, RADAR sensor(s) 660, ultrasonic sensor(s) 662, LIDAR sensor(s) 664, and/or the like. As such, the external sensor data 102 may correspond to sensors with a sensory field or field of view external to the vehicle 600 (e.g., cameras, LiDAR sensors, etc. with sensory fields including the environment exterior to the vehicle 600). However, in some embodiments, the external sensor data 102 may include sensor data from any sensors with sensory fields internal to the vehicle 600.

The vehicle localizer 112 may use the received external sensor data 102 to localize the vehicle 600 within the map 106. For example, the external sensor data 102 may include data indicating semantic environment landmarks. The semantic environment landmarks may then be matched to features of the map 106 to determine a precise location of the vehicle 600 within the map 106 in real-time.

Movement tracker 114 of the POI determination system 110 may receive the internal sensor data 104. The internal sensor data 104 may correspond to sensor data generated using one or more in-cabin sensors, such as one or more in-cabin cameras, in-cabin near-infrared (NIR) sensors, in-cabin microphones, and/or the like. As such, the internal sensor data 104 may correspond to sensors with a sensory field or field of view internal to the vehicle 600 (e.g., cameras with the occupant(s), such as the driver, in its field of view). However, in some embodiments, the internal sensor data 104 may include sensor data from any sensors with sensory fields external to the vehicle 600.

The movement tracker 114 may use the internal sensor data 104—e.g., sensor data from one or more in-cabin cameras, NIR cameras or sensors, and/or other eye-tracking sensor types—to determine gaze directions and movements, fixations, road scanning behaviors (e.g., road scanning patterns, distribution, and range), saccade information (e.g., velocity, direction, etc.), blink rate, smooth pursuit information (e.g., velocity, direction, etc.), and/or other information. The eye tracker 106 may determine time periods corresponding to certain states, such as how long a fixation lasts, and/or may track how many times certain states are determined—e.g., how many fixations, how many saccades, how many smooth pursuits, etc. The movement tracker 114 may monitor or analyze each eye individually, and/or may monitor or analyze both eyes together. For example, both eyes may be monitored in order to use triangulation for measuring a depth of an occupant's gaze. In some embodiments, the movement tracker 114 may execute one or more machine learning algorithms, deep neural networks, computer vison algorithms, image processing algorithms, mathematical algorithms, and/or the like to determine eye tracking information.

The movement tracker 114 may further use the internal sensor data 104—e.g., sensor data from one or more in-cabin cameras, microphones, pressure sensors, temperature sensors, etc.—to determine trigger actions, such as gestures, voice commands, button actuations, etc. In some embodiments, the movement tracker 114 may execute one or more machine learning algorithms, deep neural networks, computer vison algorithms, image processing algorithms, mathematical algorithms, natural language processing algorithms and/or the like to determine trigger action data.

The gaze mapper 116 may receive vehicle localization information from the vehicle localizer 112 and the eye tracking information from the movement tracker 114. Using the vehicle localization information and the eye tracking information, the gaze mapper may access the map 106 to map an occupant's field of view and gaze direction to the map 106. A virtual representation of the occupant's field of view and gaze direction may further be generated and overlaid on the map 106. In some embodiments, the gaze mapper 116 may map the gaze of an occupant to perception information of the vehicle 600—e.g., to map a representation of the gaze direction of the occupant to object detection (e.g., POI detection bounding shapes) outputs of the vehicle 600.

The POI determiner 118 may receive mapping information from the gaze mapper 116. Using the mapping information, the POI determiner 118 may determine waypoints and corresponding POIs an occupant is viewing while the vehicle 600 is traveling along a roadway. The POI determiner 118 may compare the virtual representation of the occupant's field of view with waypoint locations on the map 106 from the waypoint catalog 108 to determine POI(s) the user is viewing or potentially viewing. Each viewable waypoint within the field of view of the user may be considered a candidate waypoint for the user to fixate their gaze. In some examples, each viewable waypoint within the field of view of the user may be stored in the POI log 120.

In some embodiments, the POI determiner 118 may identify waypoints to be stored in the POI log 120 based on an occupant viewing a POI for a threshold amount of time. For example, where a mapped gaze direction of an occupant overlaps with a waypoint location in the map 106, the POI determiner 118 may determine that the user is viewing a POI associated with the waypoint at the waypoint location. In some embodiments, an overlap determination may include a threshold amount of overlap, such as 50% overlap (e.g., 50% of a bounding shape is overlapped by some portion of a gaze direction projection), 70% overlap, 90% overlap, etc. In other embodiments, any amount of overlap may satisfy the overlap determination, or complete overlap may satisfy the overlap determination. The POI determiner 118 may further track an amount of time the mapped gaze direction of the occupant overlaps with a waypoint location in the map 106. When the amount of time exceeds a threshold, the POI determiner 118 may determine the occupant is interested in the POI and store the waypoint in the POI log 120 for later review.

In some embodiments, the POI determiner 118 may identify waypoints to be stored in the POI log 120 based on trigger action data and/or an occupant's gaze direction. For example, when an occupant performs a trigger action, the POI determiner 118 may receive corresponding trigger action data from the movement tracker 114. The trigger action data may include a timestamp, which may be used to determine the occupant's gaze direction at the moment when the occupant performed the trigger action. For example, the POI determiner 118 may determine that at the moment an occupant actuated a button (e.g., on a steering wheel, on a touch display, on a console, etc.) of the vehicle 600 or otherwise indicated (e.g., physically, verbally, by a gesture, etc.) interest in a POI, the occupant's gaze overlapped with a particular billboard (or other POI type) in the field of view of the occupant.

In some embodiments, such as where the POI determiner 118 cannot determine a POI that the occupant is viewing—where no waypoint exists in the map 106 along the path of the occupant's projected gaze, or the system does not use a map to determine POI or waypoint correlations—the POI determiner 118 may map the user's gaze direction to a field of view that may be captured by an external sensor of the vehicle 600 to determine a POI the user is viewing. For example, the POI determiner 118 may receive eye tracking information from the movement tracker 114 and external sensor data 102, which may include image data captured by one or more cameras external to the vehicle 600. The POI determiner 118 may then map the occupant's gaze direction to the perception outputs (e.g., object detection, etc.) generated using the external sensor data 102 to determine a real-world view of the location the user is viewing. The POI determiner 118 may employ computer vision algorithms, machine learning, neural networks, and/or other processed to detect and/or process (e.g., using optical character recognition (OCR), image analysis, etc.) a POI the user is viewing. In some embodiments, once detected, the POI may be stored in the waypoint catalog 108 and/or in the POI log 120.

In some embodiments, waypoints stored in the POI log 120 may be available for review and/or display via an application of the vehicle 600 and/or a client device separate from the vehicle 600, such as a client mobile device. In further embodiments, the POI determination system 110 may determine that a waypoint has been added to the POI log 120 and cause the application to communicate a command to a separate application, such as a navigation application. For example, based on the POI determiner 118 storing a waypoint associated with a POI advertisement for a hamburger restaurant in the POI log 120, the POI determination system 110 may cause a navigation application to display an option for an occupant to navigate to the hamburger restaurant. In any example, the waypoint log 120 and/or individual waypoints may be stored in association with an application—such as an application of the vehicle 600, a client mobile device, and/or a server device (e.g., of a data center, such as example data center 800 of FIG. 8).

Figure 2C:
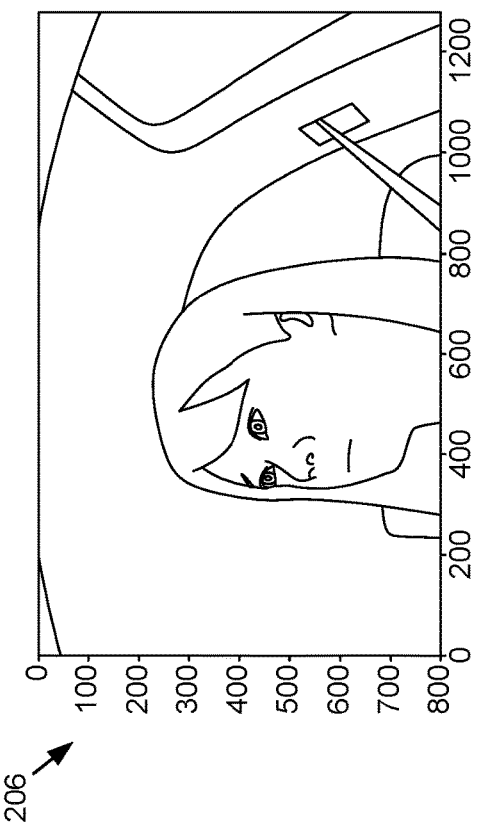
Figure 2A:
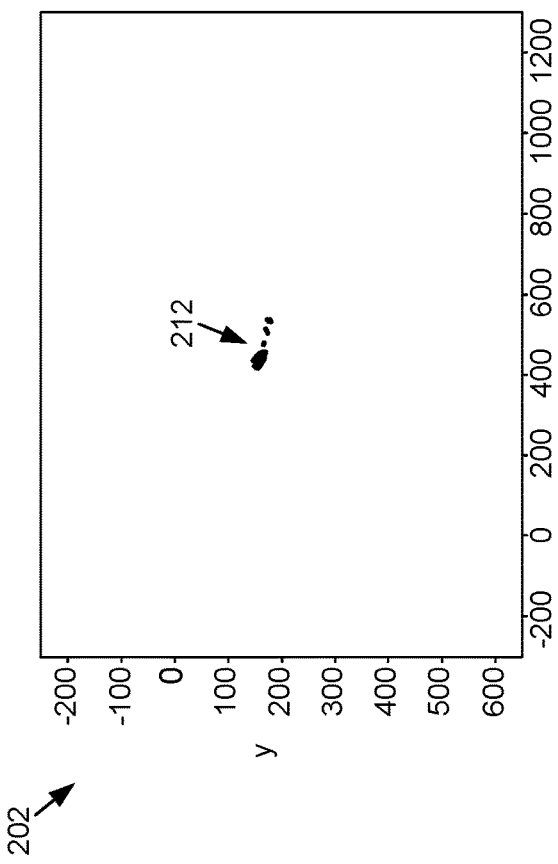
FIG. 2A depicts an example plot generated using eye movement information, in accordance with some embodiments of the present disclosure.

With reference to FIG. 2A, FIG. 2A depicts an example plot generated using eye movement information, in accordance with some embodiments of the present disclosure. FIG. 2A includes a graph 202 corresponding to a current (e.g., corresponding to a current time or a period of time—such as a second, three seconds, five seconds, etc.) gaze direction and gaze information. For example, the gaze direction may be represented by points 212, where the (x, y) locations in the graph 202 may have corresponding locations with respect to the vehicle 600. In some embodiments, the graph 202 may be used to determine a user has fixated the direction of their gaze on a POI for a threshold amount of time and/or to determine the direction of the user's gaze at the moment the system receives a trigger action.

With reference to FIGS. 2B-2C, FIGS. 2B-2C depict example illustrations of eye locations at a time step or frame used for determining eye movement information, in accordance with some embodiments of the present disclosure. Charts 204 and 20 include visualizations of an occupant— e.g., more focused on eyes of the occupant in the chart 204 and more broadly focused on the occupant in the chart 206—that may be used to generate the chart 202 of FIG. 2A. An orientation of a head and/or eyes of the occupant may be determined and used to determine a gaze direction and/or location for a current frame. In addition, the results over any number of frames (e.g., for two seconds of frames captures at 30 frames per second, or 60 frames) may be used to track movement types—such as saccades, blink rate, smooth pursuits, fixations, road scanning behaviors, and/or the like—that may be used to determine gaze direction at a moment in time. Additionally, the results may be processed to determine an interest level in POIs passed or approached by the user.

Figure 3A:
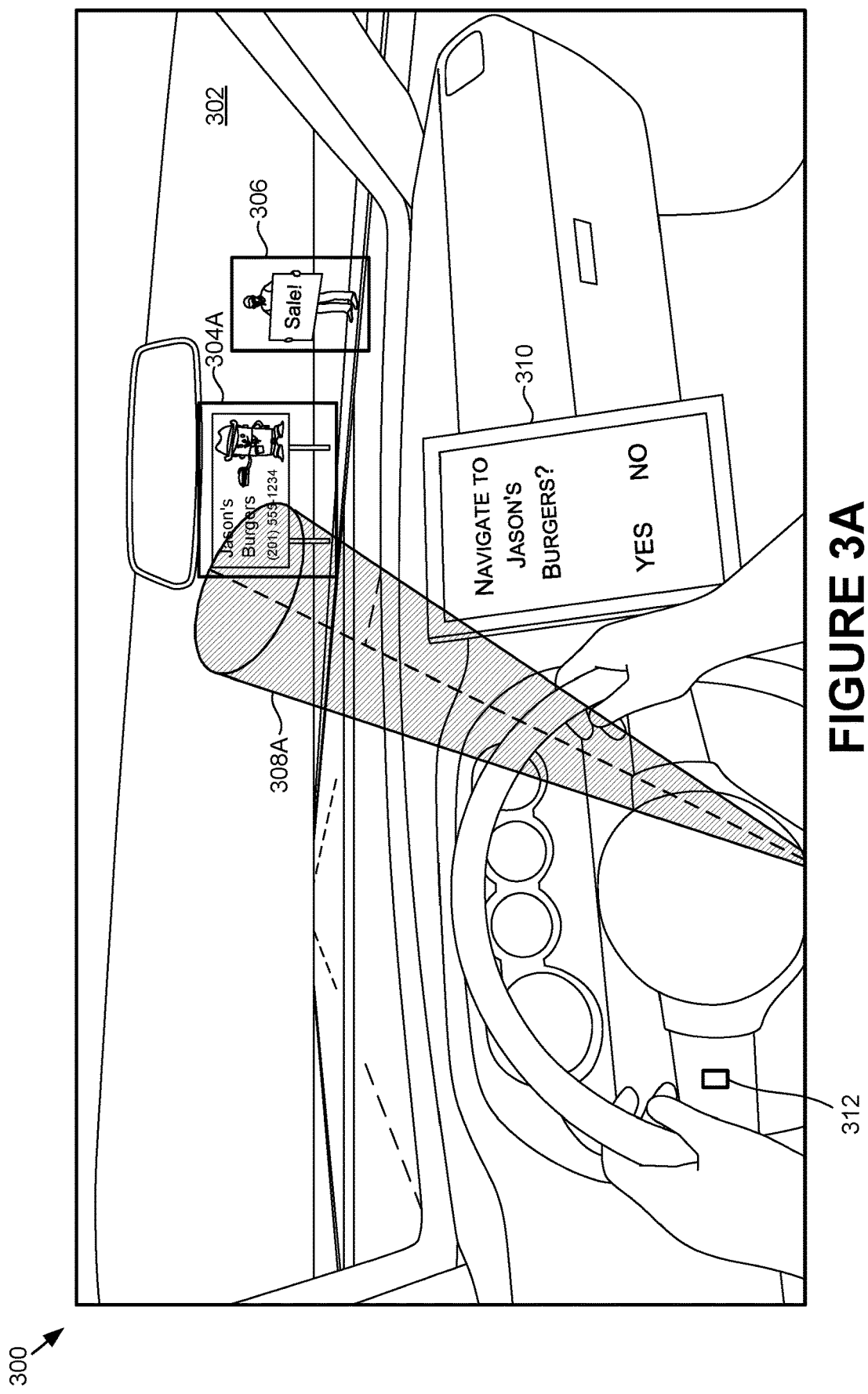
FIG. 3A depicts an example visualization of a gaze direction representation extended exterior to a vehicle for determining a POI, in accordance with some embodiments of the present disclosure.

Referring to FIG. 3A, FIG. 3A depicts an example visualization 300 of a gaze direction representation extended exterior to the vehicle 600 for determining a POI, in accordance with some embodiments of the present disclosure. The example visualization 300 includes windshield 302, billboard POI 304A, person POI 306, projection 308A, console display 310, and trigger actuator 312.

In operation, an occupant may look through the windshield 302 and the projection 308A representing the direction of the occupant's gaze (e.g., based on internal sensor data 114) may be generated by the POI determination system 110 and extended into the environment external to the vehicle 600. In some embodiments, using sensors external to the vehicle 600, the POI determination system 110 may determine billboard 304A and person POI 306 are within the field of view of the occupant. In other embodiments, using the map 106 and the waypoint catalog 108, the POI determination system 110 may determine that a waypoint corresponding to billboard 304A exists in the waypoint catalog and that no waypoint corresponding to person POI 306 exists in the waypoint catalog. The POI determination system 110 may then determine that projection 308A overlaps with billboard POI 304A and/or a waypoint corresponding to billboard POI 304A. In some embodiments, the occupant may actuate trigger actuator 312 while the projection 308A overlaps with billboard POI 304A to store the POI, and associated information, in the POI log 120. Additionally and/or alternatively, according to embodiments discussed herein, billboard 304A may be stored in the POI log 120 based on the projection 308A overlapping with billboard 304A for a threshold amount of time, based on a gesture, based on a voice command, and/or another trigger action.

The POI determination system 110 may determine that a waypoint corresponding to billboard 304A has been added to the POI log 120 and cause an application of the vehicle 600 to display a prompt on console display 310. For example, based on the POI determiner 118 storing a waypoint associated with billboard POI 304A for Jason's Burgers in the POI log 120, the POI determination system 110 may access an address for Jason's Burgers stored in association with the waypoint (e.g., stored in the waypoint catalog 108) and cause a navigation application to display an option via console display 310 for the occupant to navigate to the Jason's Burgers. Similarly, in some embodiments, the POI determination system 110 may communicate a command to a client device, such as mobile device 330 of FIG. 3C, to open a navigation application on the mobile device 330 and display an option for the occupant to select to navigate to the Jason's Burgers.

By way of example, though not depicted in FIG. 3A, if the POI determination system 110 determines that the direction of the occupant's gaze overlaps with person POI 306, the POI determination system 110 may determine that no waypoint corresponding to person POI 306 exists in the waypoint catalog and capture image data of the person POI 306 via one or more external cameras of the vehicle 600. The image data may then be processed by the POI determination system 110 and stored in the POI log 120. In some embodiments, the POI determination system 110 may determine that the person POI 306 is not a stationary POI (e.g., the person POI 306 may move locations and/or may not be viewable to others at a later time) and cause a waypoint to be generated and stored in the waypoint catalog for a period of time. For example, a waypoint corresponding to the person 306 may be added to the waypoint catalog with an expiration timeframe (e.g., expire after one day, expire on a certain date, expire after 1 hour, etc.) attached to the waypoint.

Figure 3B:
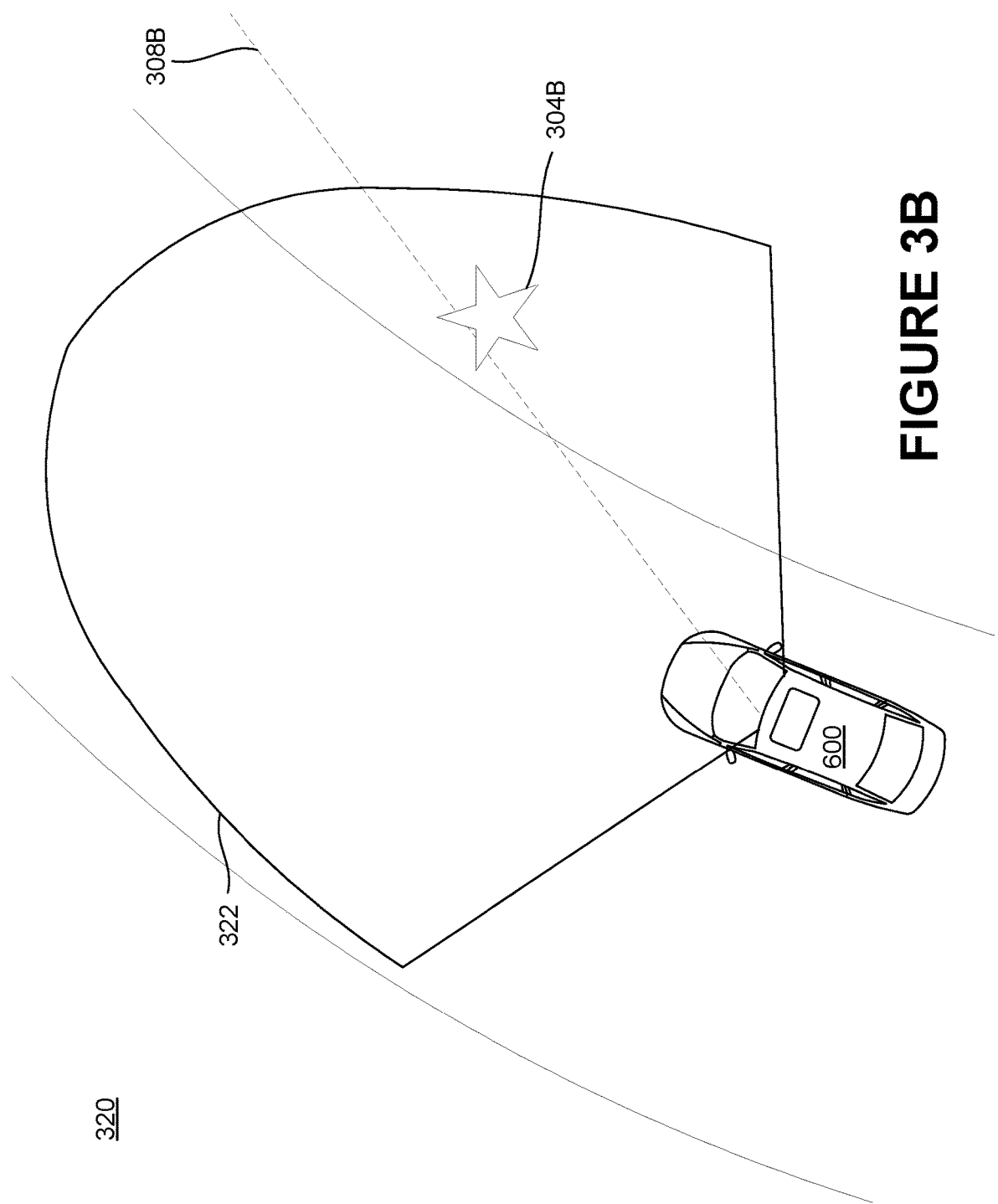
FIG. 3B depicts a top-down view of a vehicle localized on a map, in accordance with some embodiments of the present disclosure.
Figure 3C:
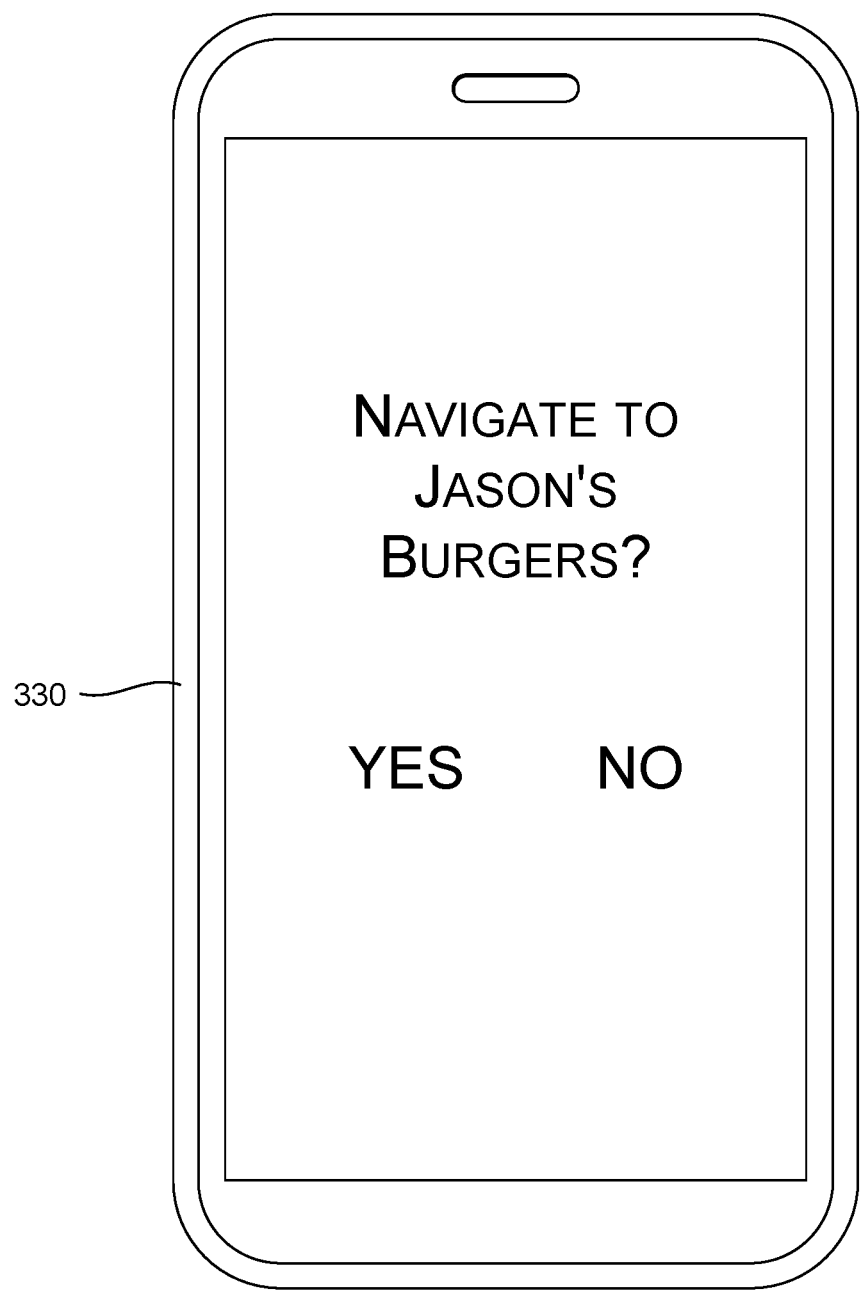
FIG. 3C depicts a mobile client device, in accordance with some embodiments of the present disclosure.

Turning to FIG. 3B, FIG. 3B depicts a top-down view of a vehicle localized on a map, in accordance with some embodiments of the present disclosure. FIG. 3B includes map 320, field of view 322, waypoint 304B, projected gaze direction 308B and vehicle 600.

In operation, the projected gaze direction 308B may be mapped to the map 320 (which may correspond to map 106 of FIG. 1), which includes waypoint 304B. The POI determination system 110 may then determine that projection 308B overlaps with waypoint 304B. In some embodiments, an occupant of vehicle 600 may perform a trigger action (e.g., a gesture, a voice command, button actuation, and/or another trigger action) while the projection 308B overlaps with the waypoint 304B to store the waypoint 304B, and associated information, in the POI log 120. Additionally and/or alternatively, according to embodiments discussed herein, waypoint 304B may be stored in the POI log 120 based on the projection 308B overlapping with billboard 304A for a threshold amount of time.

Figure 4:
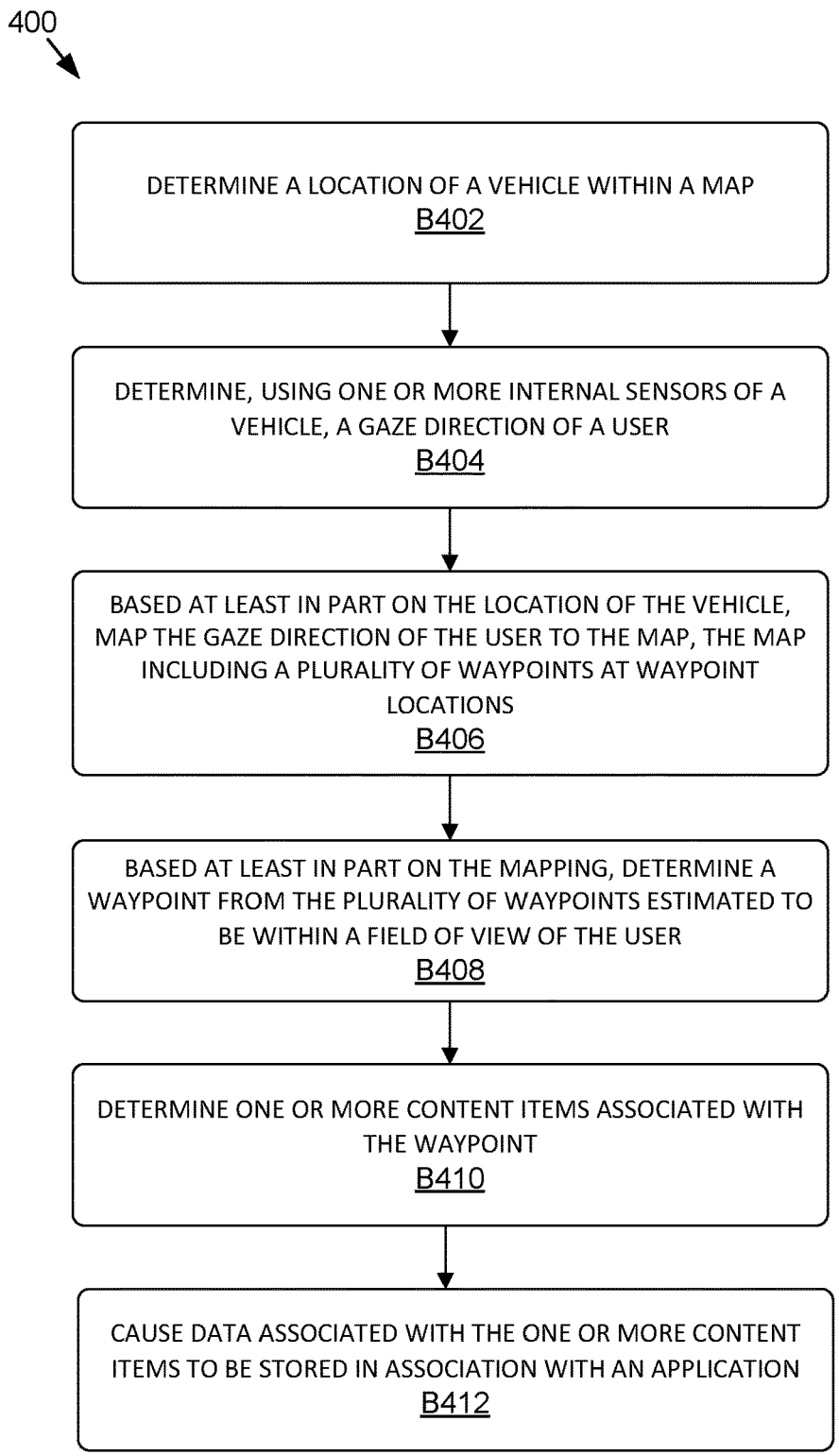
FIG. 4 is a flow diagram showing a method for determining a waypoint from a plurality of waypoints estimated to be within a field of view of a user, in accordance with some embodiments of the present disclosure.
Figure 5:
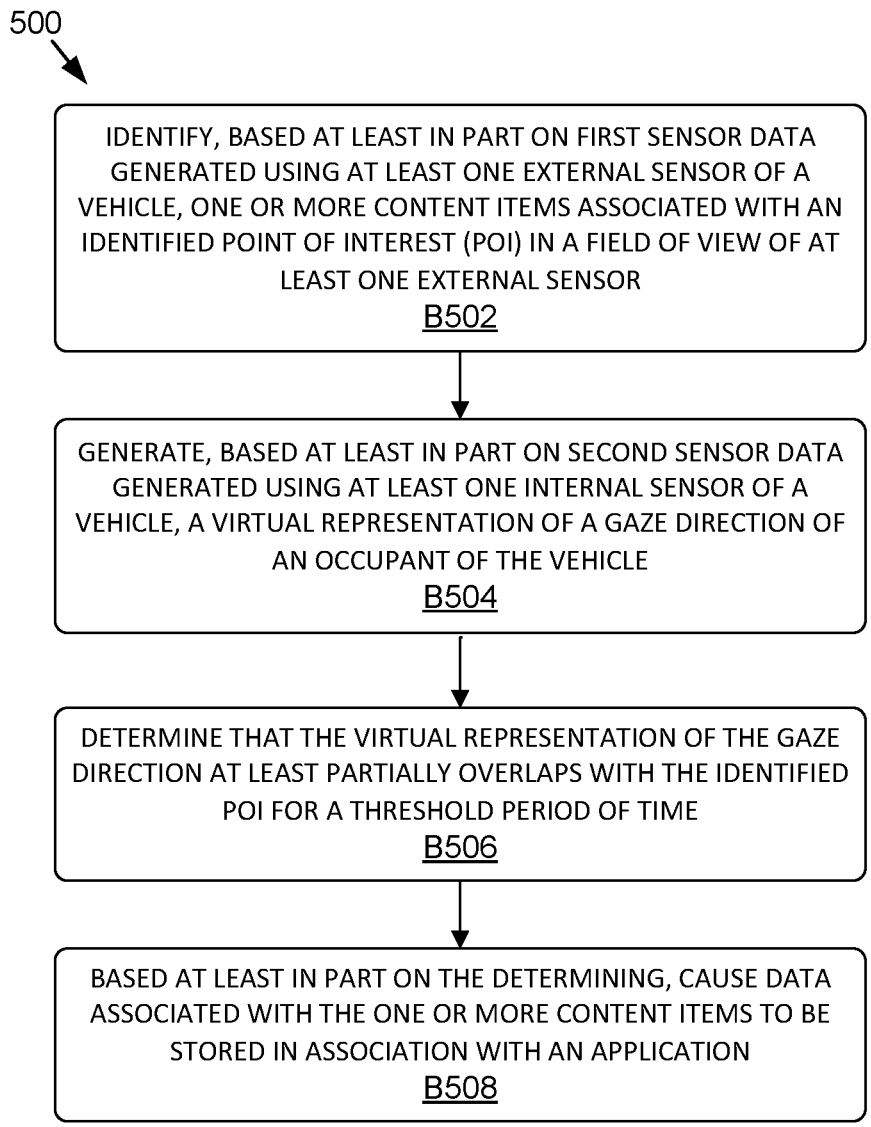
FIG. 5 is a flow diagram showing a method for causing data associated with one or more content items to be stored in association with an application, in accordance with some embodiments of the present disclosure.

Now referring to FIGS. 4 and 5, each block of methods 400 and 500, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 400 and 500 are described, by way of example, with respect to the POI determination system 100 of FIG. 1. However, these methods may additionally or alternatively be executed by any one system, or any combination of systems, including, but not limited to, those described herein.

With reference to FIG. 4, FIG. 4 is a flow diagram showing a method 400 for determining a waypoint from a plurality of waypoints estimated to be within a field of view of a user, in accordance with some embodiments of the present disclosure. The method 400, at block B402, includes determining a location of the vehicle 600 within a map. For example, one or more vehicle sensors—such as, an external camera, a GNSS receiver, an IMU sensor(s), a vehicle speedometer, LIDAR, RADAR, etc.—may be used by the system to localize the vehicle within the map.

The method 400, at block B404, includes determining, using one or more internal sensors of a vehicle, a gaze direction of a user using one or more internal sensors of a vehicle. For example, an eye tracker may use sensor data from one or more in-cabin cameras, NIR cameras, or sensors, and/or other eye-tracking sensor types to determine the user's gaze direction relative to the vehicle 600.

The method 400, at block 406, includes, based at least in part on the location of the vehicle, mapping the gaze direction of the user to the map, the map including a plurality of waypoints at waypoint locations. For example, using vehicle localization information and eye tracking information, a gaze mapper may access a map—such as an HD map—to map an occupant's field of view and/or gaze direction to the map, which may include a waypoint catalog.

The method 400, at block 408, includes, based at least in part on the mapping, determining a waypoint from the plurality of waypoints estimated to be within a field of view of the user. For example, a waypoint from the waypoint catalog 108 may be determined to be within the field of view of the user.

The method 400, at block B410, includes determining one or more content items associated with the waypoint. For example, an advertiser name, advertiser contact information, an advertisement image (e.g., as determined using perception of the vehicle 600 or as stored in the catalog), advertiser website information, links to additional content, etc. relating to the waypoint within the field of view of the user may be determined. When the system determines a user is viewing a POI, the system may access the related content.

The method 400, at block 412, includes causing data associated with the one or more content items to be stored in association with an application. For example, the waypoint log 120 and/or individual waypoints may be stored in association with an application—such as an application of the vehicle 600, a client mobile device, and/or a server device.

Now referring to FIG. 5, FIG. 5 is a flow diagram showing a method 500 for causing data associated with one or more content items to be stored in association with an application, in accordance with some embodiments of the present disclosure. The method 500, at block B502, includes identifying, based at least in part on first sensor data generated using at least one external sensor of a vehicle, one or more content items associated with an identified point of interest (POI) in a field of view of at least one external sensor. For example, the system may employ an object detection algorithm to determine a bounding box(es) for a POI(s) in the field of view of the user. As such, a user traveling in the vehicle 600 may execute a trigger action while looking at a person holding an advertisement and the system may determine that the user's gaze direction overlaps with a bounding box of a determined POI associated with the person holding the advertisement.

The method 500, at block 504, includes generating, based at least in part on second sensor data generated using at least one internal sensor of a vehicle, a virtual representation of a gaze direction of an occupant of the vehicle. For example, an eye tracker may use sensor data from one or more in-cabin cameras, NIR cameras, or sensors, and/or other eye-tracking sensor types to determine the user's gaze direction relative to the vehicle 600.

The method 500, at block 506 includes, determining that the virtual representation of the gaze direction at least partially overlaps with the identified POI for a threshold period of time. For example, the POI determiner 118 may track an amount of time a mapped gaze direction of the occupant overlaps with a waypoint location in the map 106. When the amount of time exceeds a threshold, the POI determiner 118 may determine the occupant is interested in the POI and store the waypoint in the POI log 120 for later review.

The method 500, at block 508, includes, based at least in part on the determining, causing data associated with the one or more content items to be stored in association with an application. For example, the waypoint log 120 and/or individual waypoints may be stored in association with an application—such as an application of the vehicle 600, a client mobile device, and/or a server device.

Example Autonomous Vehicle

Figure 6A:
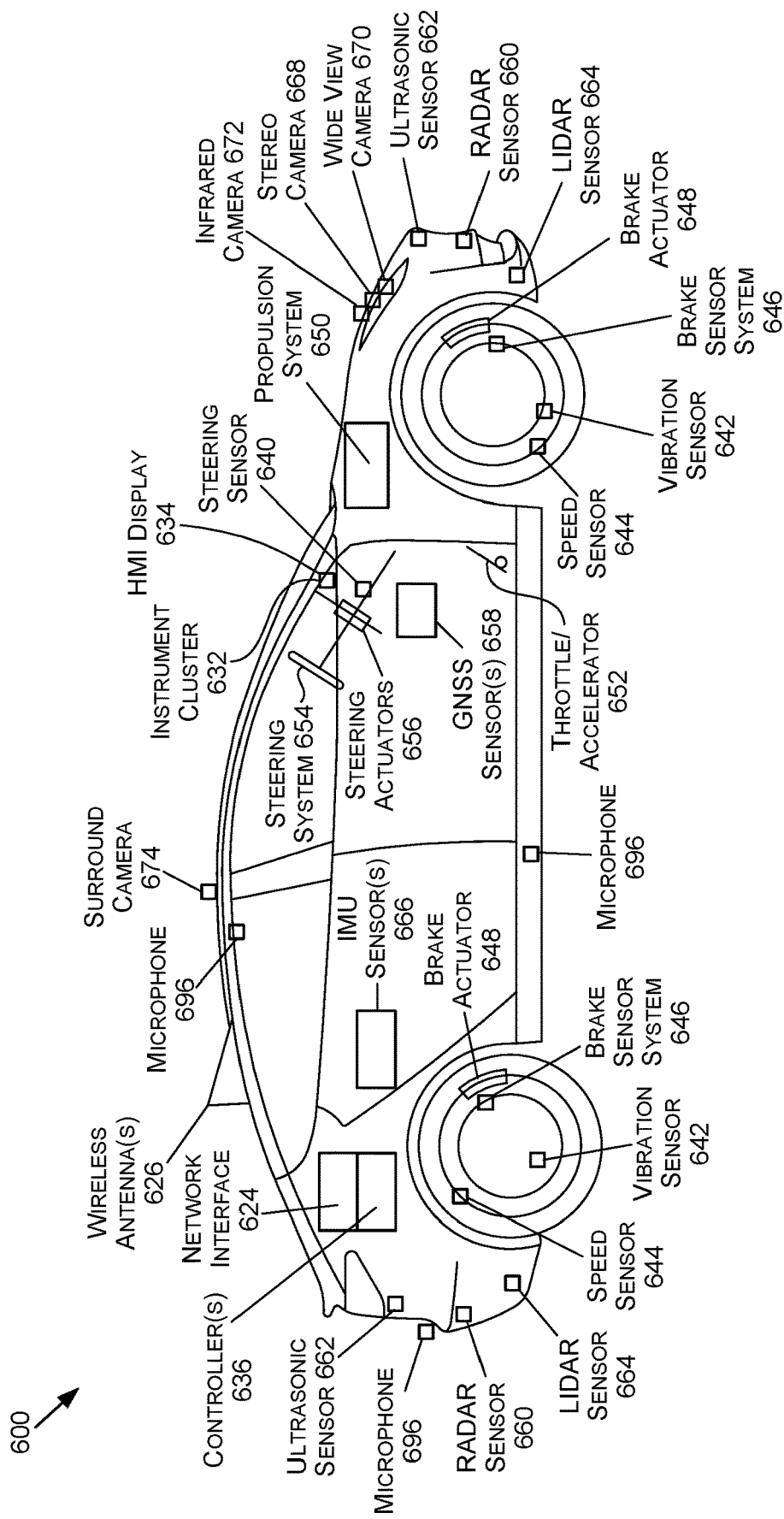
FIG. 6A is an illustration of an example autonomous vehicle, in accordance with some embodiments of the present disclosure.

FIG. 6A is an illustration of an example autonomous vehicle 600, in accordance with some embodiments of the present disclosure. The autonomous vehicle 600 (alternatively referred to herein as the "vehicle 600") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 600 may be capable of functionality in accordance with one or more of Level 3-Level 5 of the autonomous driving levels. For example, the vehicle 600 may be capable of conditional automation (Level 3), high automation (Level 4), and/or full automation (Level 5), depending on the embodiment.

The vehicle 600 may include components such as a chassis, a vehicle body, wheels (e.g., 2, 4, 6, 8, 18, etc.), tires, axles, and other components of a vehicle. The vehicle 600 may include a propulsion system 650, such as an internal combustion engine, hybrid electric power plant, an all-electric engine, and/or another propulsion system type. The propulsion system 650 may be connected to a drive train of the vehicle 600, which may include a transmission, to enable the propulsion of the vehicle 600. The propulsion system 650 may be controlled in response to receiving signals from the throttle/accelerator 652.

A steering system 654, which may include a steering wheel, may be used to steer the vehicle 600 (e.g., along a desired path or route) when the propulsion system 650 is operating (e.g., when the vehicle is in motion). The steering system 654 may receive signals from a steering actuator 656. The steering wheel may be optional for full automation (Level 5) functionality.

The brake sensor system 646 may be used to operate the vehicle brakes in response to receiving signals from the brake actuators 648 and/or brake sensors.

Controller(s) 636, which may include one or more system on chips (SoCs) 604 (FIG. 6C) and/or GPU(s), may provide signals (e.g., representative of commands) to one or more components and/or systems of the vehicle 600. For example, the controller(s) may send signals to operate the vehicle brakes via one or more brake actuators 648, to operate the steering system 654 via one or more steering actuators 656, to operate the propulsion system 650 via one or more throttle/accelerators 652. The controller(s) 636 may include one or more onboard (e.g., integrated) computing devices (e.g., supercomputers) that process sensor signals, and output operation commands (e.g., signals representing commands) to enable autonomous driving and/or to assist a human driver in driving the vehicle 600. The controller(s) 636 may include a first controller 636 for autonomous driving functions, a second controller 636 for functional safety functions, a third controller 636 for artificial intelligence functionality (e.g., computer vision), a fourth controller 636 for infotainment functionality, a fifth controller 636 for redundancy in emergency conditions, and/or other controllers. In some examples, a single controller 636 may handle two or more of the above functionalities, two or more controllers 636 may handle a single functionality, and/or any combination thereof.

The controller(s) 636 may provide the signals for controlling one or more components and/or systems of the vehicle 600 in response to sensor data received from one or more sensors (e.g., sensor inputs). The sensor data may be received from, for example and without limitation, global navigation satellite systems sensor(s) 658 (e.g., Global Positioning System sensor(s)), RADAR sensor(s) 660, ultrasonic sensor(s) 662, LIDAR sensor(s) 664, inertial measurement unit (IMU) sensor(s) 666 (e.g., accelerometer(s), gyroscope(s), magnetic compass(es), magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range and/or mid-range camera(s) 698, speed sensor(s) 644 (e.g., for measuring the speed of the vehicle 600), vibration sensor(s) 642, steering sensor(s) 640, brake sensor(s) (e.g., as part of the brake sensor system 646), and/or other sensor types.

One or more of the controller(s) 636 may receive inputs (e.g., represented by input data) from an instrument cluster 632 of the vehicle 600 and provide outputs (e.g., represented by output data, display data, etc.) via a human-machine interface (HMI) display 634, an audible annunciator, a loudspeaker, and/or via other components of the vehicle 600. The outputs may include information such as vehicle velocity, speed, time, map data (e.g., the HD map 622 of FIG. 6C), location data (e.g., the vehicle's 600 location, such as on a map), direction, location of other vehicles (e.g., an occupancy grid), information about objects and status of objects as perceived by the controller(s) 636, etc. For example, the HMI display 634 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 600 further includes a network interface 624 which may use one or more wireless antenna(s) 626 and/or modem(s) to communicate over one or more networks. For example, the network interface 624 may be capable of communication over LTE, WCDMA, UMTS, GSM, CDMA2000, etc. The wireless antenna(s) 626 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 6B:
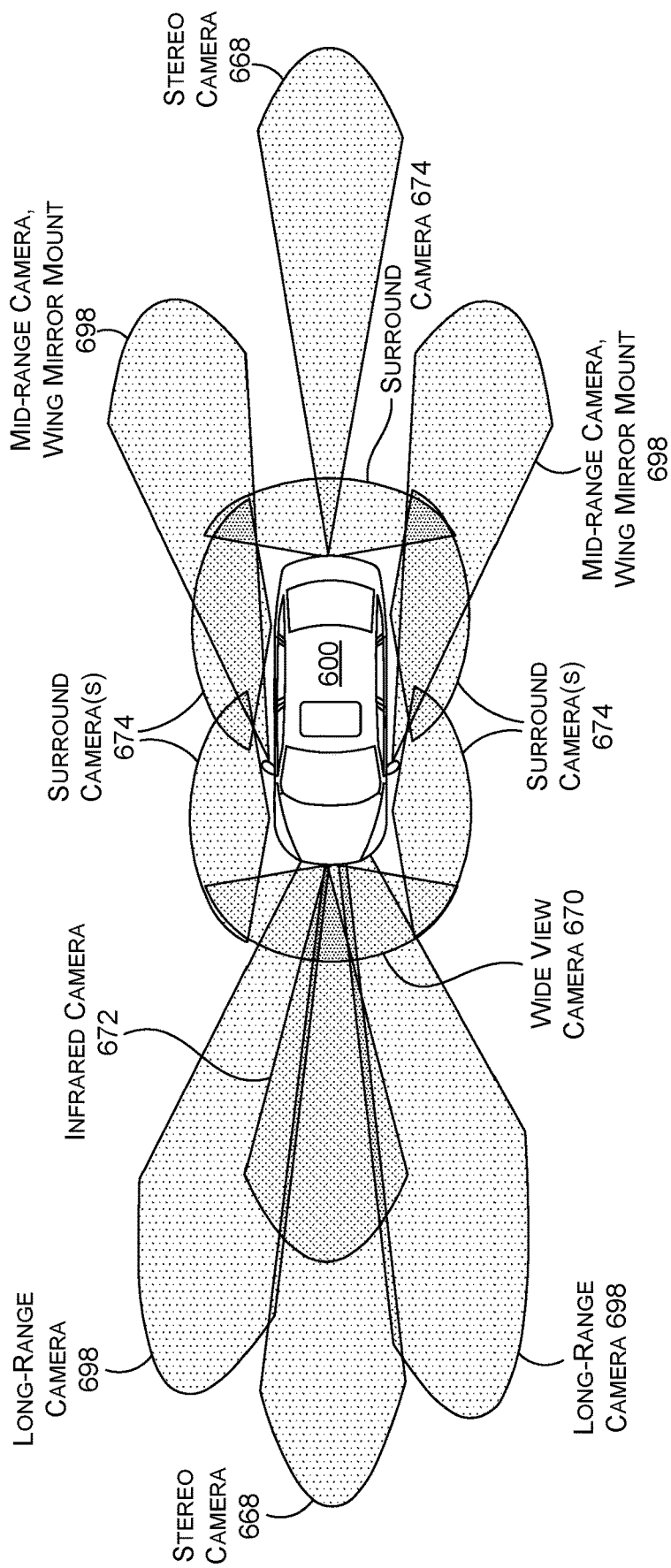
FIG. 6B is an example of camera locations and fields of view for the example autonomous vehicle of FIG. 6A, in accordance with some embodiments of the present disclosure.

FIG. 6B is an example of camera locations and fields of view for the example autonomous vehicle 600 of FIG. 6A, in accordance with some embodiments of the present disclosure. The cameras and respective fields of view are one example embodiment and are not intended to be limiting. For example, additional and/or alternative cameras may be included and/or the cameras may be located at different locations on the vehicle 600.

The camera types for the cameras may include, but are not limited to, digital cameras that may be adapted for use with the components and/or systems of the vehicle 600. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 600 (e.g., front-facing cameras) may be used for surround view, to help identify forward facing paths and obstacles, as well aid in, with the help of one or more controllers 636 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 670 that may be used to perceive objects coming into view from the periphery (e.g., pedestrians, crossing traffic or bicycles). Although only one wide-view camera is illustrated in FIG. 6B, there may any number of wide-view cameras 670 on the vehicle 600. In addition, long-range camera(s) 698 (e.g., a long-view stereo camera pair) may be used for depth-based object detection, especially for objects for which a neural network has not yet been trained. The long-range camera(s) 698 may also be used for object detection and classification, as well as basic object tracking.

One or more stereo cameras 668 may also be included in a front-facing configuration. The stereo camera(s) 668 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 668 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 668 may be used in addition to, or alternatively from, those described herein.

Cameras with a field of view that include portions of the environment to the side of the vehicle 600 (e.g., side-view cameras) may be used for surround view, providing information used to create and update the occupancy grid, as well as to generate side impact collision warnings. For example, surround camera(s) 674 (e.g., four surround cameras 674 as illustrated in FIG. 6B) may be positioned to on the vehicle 600. The surround camera(s) 674 may include wide-view camera(s) 670, fisheye camera(s), 360 degree camera(s), and/or the like. Four example, four fisheye cameras may be positioned on the vehicle's front, rear, and sides. In an alternative arrangement, the vehicle may use three surround camera(s) 674 (e.g., left, right, and rear), and may leverage one or more other camera(s) (e.g., a forward-facing camera) as a fourth surround view camera.

Cameras with a field of view that include portions of the environment to the rear of the vehicle 600 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 698, stereo camera(s) 668), infrared camera(s) 672, etc.), as described herein.

Figure 6C:
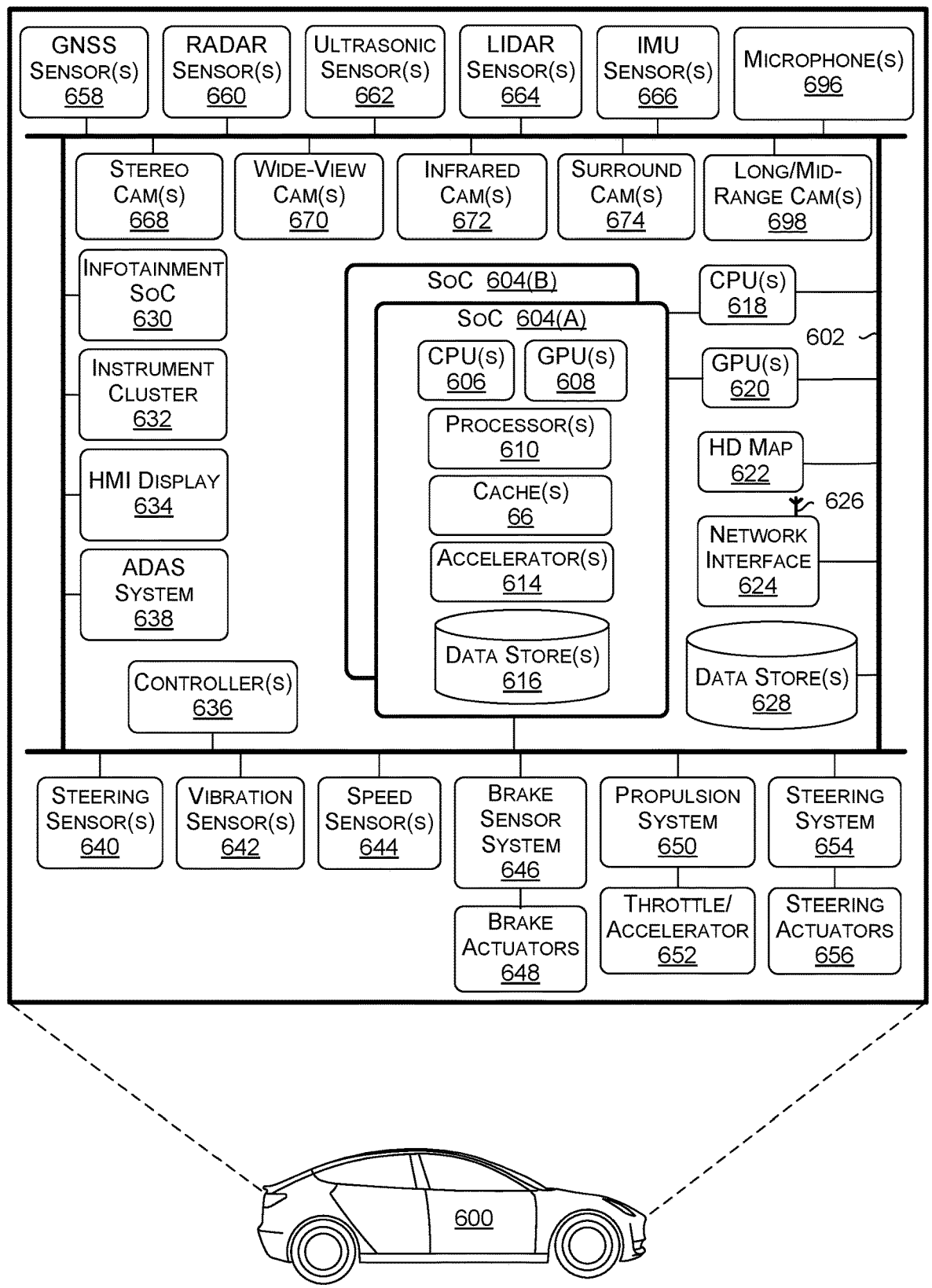
FIG. 6C is a block diagram of an example system architecture for the example autonomous vehicle of FIG. 6A, in accordance with some embodiments of the present disclosure.

FIG. 6C is a block diagram of an example system architecture for the example autonomous vehicle 600 of FIG. 6A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 600 in FIG. 6C are illustrated as being connected via bus 602. The bus 602 may include a Controller Area Network (CAN) data interface (alternatively referred to herein as a "CAN bus"). A CAN may be a network inside the vehicle 600 used to aid in control of various features and functionality of the vehicle 600, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 602 is described herein as being a CAN bus, this is not intended to be limiting. For example, in addition to, or alternatively from, the CAN bus, FlexRay and/or Ethernet may be used. Additionally, although a single line is used to represent the bus 602, this is not intended to be limiting. For example, there may be any number of busses 602, which may include one or more CAN busses, one or more FlexRay busses, one or more Ethernet busses, and/or one or more other types of busses using a different protocol. In some examples, two or more busses 602 may be used to perform different functions, and/or may be used for redundancy. For example, a first bus 602 may be used for collision avoidance functionality and a second bus 602 may be used for actuation control. In any example, each bus 602 may communicate with any of the components of the vehicle 600, and two or more busses 602 may communicate with the same components. In some examples, each SoC 604, each controller 636, and/or each computer within the vehicle may have access to the same input data (e.g., inputs from sensors of the vehicle 600), and may be connected to a common bus, such the CAN bus.

The vehicle 600 may include one or more controller(s) 636, such as those described herein with respect to FIG. 6A. The controller(s) 636 may be used for a variety of functions. The controller(s) 636 may be coupled to any of the various other components and systems of the vehicle 600, and may be used for control of the vehicle 600, artificial intelligence of the vehicle 600, infotainment for the vehicle 600, and/or the like.

The vehicle 600 may include a system(s) on a chip (SoC) 604. The SoC 604 may include CPU(s) 606, GPU(s) 608, processor(s) 610, cache(s) 612, accelerator(s) 614, data store(s) 616, and/or other components and features not illustrated. The SoC(s) 604 may be used to control the vehicle 600 in a variety of platforms and systems. For example, the SoC(s) 604 may be combined in a system (e.g., the system of the vehicle 600) with an HD map 622 which may obtain map refreshes and/or updates via a network interface 624 from one or more servers (e.g., server(s) 678 of FIG. 6D).

The CPU(s) 606 may include a CPU cluster or CPU complex (alternatively referred to herein as a "CCPLEX"). The CPU(s) 606 may include multiple cores and/or L2 caches. For example, in some embodiments, the CPU(s) 606 may include eight cores in a coherent multi-processor configuration. In some embodiments, the CPU(s) 606 may include four dual-core clusters where each cluster has a dedicated L2 cache (e.g., a 2 MB L2 cache). The CPU(s) 606 (e.g., the CCPLEX) may be configured to support simultaneous cluster operation enabling any combination of the clusters of the CPU(s) 606 to be active at any given time.

The CPU(s) 606 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 606 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 608 may include an integrated GPU (alternatively referred to herein as an "iGPU"). The GPU(s) 608 may be programmable and may be efficient for parallel workloads. The GPU(s) 608, in some examples, may use an enhanced tensor instruction set. The GPU(s) 608 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 608 may include at least eight streaming microprocessors. The GPU(s) 608 may use compute application programming interface(s) (API(s)). In addition, the GPU(s) 608 may use one or more parallel computing platforms and/or programming models (e.g., NVIDIA's CUDA).

The GPU(s) 608 may be power-optimized for best performance in automotive and embedded use cases. For example, the GPU(s) 608 may be fabricated on a Fin field-effect transistor (FinFET). However, this is not intended to be limiting and the GPU(s) 608 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 608 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 608 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 608 to access the CPU(s) 606 page tables directly. In such examples, when the GPU(s) 608 memory management unit (MMU) experiences a miss, an address translation request may be transmitted to the CPU(s) 606. In response, the CPU(s) 606 may look in its page tables for the virtual-to-physical mapping for the address and transmits the translation back to the GPU(s) 608. As such, unified memory technology may allow a single unified virtual address space for memory of both the CPU(s) 606 and the GPU(s) 608, thereby simplifying the GPU(s) 608 programming and porting of applications to the GPU(s) 608.

In addition, the GPU(s) 608 may include an access counter that may keep track of the frequency of access of the GPU(s) 608 to memory of other processors. The access counter may help ensure that memory pages are moved to the physical memory of the processor that is accessing the pages most frequently.

The SoC(s) 604 may include any number of cache(s) 612, including those described herein. For example, the cache(s) 612 may include an L3 cache that is available to both the CPU(s) 606 and the GPU(s) 608 (e.g., that is connected both the CPU(s) 606 and the GPU(s) 608). The cache(s) 612 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 604 may include an arithmetic logic unit(s) (ALU(s)) which may be leveraged in performing processing with respect to any of the variety of tasks or operations of the vehicle 600—such as processing DNNs. In addition, the SoC(s) 604 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 606 and/or GPU(s) 608.

The SoC(s) 604 may include one or more accelerators 614 (e.g., hardware accelerators, software accelerators, or a combination thereof). For example, the SoC(s) 604 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 608 and to off-load some of the tasks of the GPU(s) 608 (e.g., to free up more cycles of the GPU(s) 608 for performing other tasks). As an example, the accelerator(s) 614 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 614 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 608, and by using an inference accelerator, for example, a designer may target either the DLA(s) or the GPU(s) 608 for any function. For example, the designer may focus processing of CNNs and floating point operations on the DLA(s) and leave other functions to the GPU(s) 608 and/or other accelerator(s) 614.

The accelerator(s) 614 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 606. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 614 (e.g., the hardware acceleration cluster) may include a computer vision network on-chip and SRAM, for providing a high-bandwidth, low latency SRAM for the accelerator(s) 614. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 604 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 614 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 666 output that correlates with the vehicle 600 orientation, distance, 3D location estimates of the object obtained from the neural network and/or other sensors (e.g., LIDAR sensor(s) 664 or RADAR sensor(s) 660), among others.

The SoC(s) 604 may include data store(s) 616 (e.g., memory). The data store(s) 616 may be on-chip memory of the SoC(s) 604, which may store neural networks to be executed on the GPU and/or the DLA. In some examples, the data store(s) 616 may be large enough in capacity to store multiple instances of neural networks for redundancy and safety. The data store(s) 612 may comprise L2 or L3 cache(s) 612. Reference to the data store(s) 616 may include reference to the memory associated with the PVA, DLA, and/or other accelerator(s) 614, as described herein.

The SoC(s) 604 may include one or more processor(s) 610 (e.g., embedded processors). The processor(s) 610 may include a boot and power management processor that may be a dedicated processor and subsystem to handle boot power and management functions and related security enforcement. The boot and power management processor may be a part of the SoC(s) 604 boot sequence and may provide runtime power management services. The boot power and management processor may provide clock and voltage programming, assistance in system low power state transitions, management of SoC(s) 604 thermals and temperature sensors, and/or management of the SoC(s) 604 power states. Each temperature sensor may be implemented as a ring-oscillator whose output frequency is proportional to temperature, and the SoC(s) 604 may use the ring-oscillators to detect temperatures of the CPU(s) 606, GPU(s) 608, and/or accelerator(s) 614. If temperatures are determined to exceed a threshold, the boot and power management processor may enter a temperature fault routine and put the SoC(s) 604 into a lower power state and/or put the vehicle 600 into a chauffeur to safe stop mode (e.g., bring the vehicle 600 to a safe stop).

The processor(s) 610 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 610 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 610 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 610 may further include a real-time camera engine that may include a dedicated processor subsystem for handling real-time camera management.

The processor(s) 610 may further include a high-dynamic range signal processor that may include an image signal processor that is a hardware engine that is part of the camera processing pipeline.

The processor(s) 610 may include a video image compositor that may be a processing block (e.g., implemented on a microprocessor) that implements video post-processing functions needed by a video playback application to produce the final image for the player window. The video image compositor may perform lens distortion correction on wide-view camera(s) 670, surround camera(s) 674, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 608 is not required to continuously render new surfaces. Even when the GPU(s) 608 is powered on and active doing 3D rendering, the video image compositor may be used to offload the GPU(s) 608 to improve performance and responsiveness.

The SoC(s) 604 may further include a mobile industry processor interface (MIPI) camera serial interface for receiving video and input from cameras, a high-speed interface, and/or a video input block that may be used for camera and related pixel input functions. The SoC(s) 604 may further include an input/output controller(s) that may be controlled by software and may be used for receiving I/O signals that are uncommitted to a specific role.

The SoC(s) 604 may further include a broad range of peripheral interfaces to enable communication with peripherals, audio codecs, power management, and/or other devices. The SoC(s) 604 may be used to process data from cameras (e.g., connected over Gigabit Multimedia Serial Link and Ethernet), sensors (e.g., LIDAR sensor(s) 664, RADAR sensor(s) 660, etc. that may be connected over Ethernet), data from bus 602 (e.g., speed of vehicle 600, steering wheel position, etc.), data from GNSS sensor(s) 658 (e.g., connected over Ethernet or CAN bus). The SoC(s) 604 may further include dedicated high-performance mass storage controllers that may include their own DMA engines, and that may be used to free the CPU(s) 606 from routine data management tasks.

The SoC(s) 604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 604 may be faster, more reliable, and even more energy-efficient and space-efficient than conventional systems. For example, the accelerator(s) 614, when combined with the CPU(s) 606, the GPU(s) 608, and the data store(s) 616, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 620) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 608.

In some examples, a CNN for facial recognition and vehicle owner identification may use data from camera sensors to identify the presence of an authorized driver and/or owner of the vehicle 600. The always on sensor processing engine may be used to unlock the vehicle when the owner approaches the driver door and turn on the lights, and, in security mode, to disable the vehicle when the owner leaves the vehicle. In this way, the SoC(s) 604 provide for security against theft and/or carjacking.

In another example, a CNN for emergency vehicle detection and identification may use data from microphones 696 to detect and identify emergency vehicle sirens. In contrast to conventional systems, that use general classifiers to detect sirens and manually extract features, the SoC(s) 604 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 658. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 662, until the emergency vehicle(s) passes.

The vehicle may include a CPU(s) 618 (e.g., discrete CPU(s), or dCPU(s)), that may be coupled to the SoC(s) 604 via a high-speed interconnect (e.g., PCIe). The CPU(s) 618 may include an X86 processor, for example. The CPU(s) 618 may be used to perform any of a variety of functions, including arbitrating potentially inconsistent results between ADAS sensors and the SoC(s) 604, and/or monitoring the status and health of the controller(s) 636 and/or infotainment SoC 630, for example.

The vehicle 600 may include a GPU(s) 620 (e.g., discrete GPU(s), or dGPU(s)), that may be coupled to the SoC(s) 604 via a high-speed interconnect (e.g., NVIDIA's NVLINK). The GPU(s) 620 may provide additional artificial intelligence functionality, such as by executing redundant and/or different neural networks, and may be used to train and/or update neural networks based on input (e.g., sensor data) from sensors of the vehicle 600.

The vehicle 600 may further include the network interface 624 which may include one or more wireless antennas 626 (e.g., one or more wireless antennas for different communication protocols, such as a cellular antenna, a Bluetooth antenna, etc.). The network interface 624 may be used to enable wireless connectivity over the Internet with the cloud (e.g., with the server(s) 678 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 600 information about vehicles in proximity to the vehicle 600 (e.g., vehicles in front of, on the side of, and/or behind the vehicle 600). This functionality may be part of a cooperative adaptive cruise control functionality of the vehicle 600.

The network interface 624 may include a SoC that provides modulation and demodulation functionality and enables the controller(s) 636 to communicate over wireless networks. The network interface 624 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 600 may further include data store(s) 628 which may include off-chip (e.g., off the SoC(s) 604) storage. The data store(s) 628 may include one or more storage elements including RAM, SRAM, DRAM, VRAM, Flash, hard disks, and/or other components and/or devices that may store at least one bit of data.

The vehicle 600 may further include GNSS sensor(s) 658. The GNSS sensor(s) 658 (e.g., GPS, assisted GPS sensors, differential GPS (DGPS) sensors, etc.), to assist in mapping, perception, occupancy grid generation, and/or path planning functions. Any number of GNSS sensor(s) 658 may be used, including, for example and without limitation, a GPS using a USB connector with an Ethernet to Serial (RS-232) bridge.

The vehicle 600 may further include RADAR sensor(s) 660. The RADAR sensor(s) 660 may be used by the vehicle 600 for long-range vehicle detection, even in darkness and/or severe weather conditions. RADAR functional safety levels may be ASIL B. The RADAR sensor(s) 660 may use the CAN and/or the bus 602 (e.g., to transmit data generated by the RADAR sensor(s) 660) for control and to access object tracking data, with access to Ethernet to access raw data in some examples. A wide variety of RADAR sensor types may be used. For example, and without limitation, the RADAR sensor(s) 660 may be suitable for front, rear, and side RADAR use. In some example, Pulse Doppler RADAR sensor(s) are used.

The RADAR sensor(s) 660 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 660 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 600 surroundings at higher speeds with minimal interference from traffic in adjacent lanes. The other two antennae may expand the field of view, making it possible to quickly detect vehicles entering or leaving the vehicle's 600 lane.

Mid-range RADAR systems may include, as an example, a range of up to 660 m (front) or 80 m (rear), and a field of view of up to 42 degrees (front) or 650 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 600 may further include ultrasonic sensor(s) 662. The ultrasonic sensor(s) 662, which may be positioned at the front, back, and/or the sides of the vehicle 600, may be used for park assist and/or to create and update an occupancy grid. A wide variety of ultrasonic sensor(s) 662 may be used, and different ultrasonic sensor(s) 662 may be used for different ranges of detection (e.g., 2.5 m, 4 m). The ultrasonic sensor(s) 662 may operate at functional safety levels of ASIL B.

The vehicle 600 may include LIDAR sensor(s) 664. The LIDAR sensor(s) 664 may be used for object and pedestrian detection, emergency braking, collision avoidance, and/or other functions. The LIDAR sensor(s) 664 may be functional safety level ASIL B. In some examples, the vehicle 600 may include multiple LIDAR sensors 664 (e.g., two, four, six, etc.) that may use Ethernet (e.g., to provide data to a Gigabit Ethernet switch).

In some examples, the LIDAR sensor(s) 664 may be capable of providing a list of objects and their distances for a 360-degree field of view. Commercially available LIDAR sensor(s) 664 may have an advertised range of approximately 600 m, with an accuracy of 2 cm-3 cm, and with support for a 600 Mbps Ethernet connection, for example. In some examples, one or more non-protruding LIDAR sensors 664 may be used. In such examples, the LIDAR sensor(s) 664 may be implemented as a small device that may be embedded into the front, rear, sides, and/or corners of the vehicle 600. The LIDAR sensor(s) 664, in such examples, may provide up to a 120-degree horizontal and 35-degree vertical field of view, with a 200 m range even for low-reflectivity objects. Front-mounted LIDAR sensor(s) 664 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 600. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 664 may be less susceptible to motion blur, vibration, and/or shock.

The vehicle may further include IMU sensor(s) 666. The IMU sensor(s) 666 may be located at a center of the rear axle of the vehicle 600, in some examples. The IMU sensor(s) 666 may include, for example and without limitation, an accelerometer(s), a magnetometer(s), a gyroscope(s), a magnetic compass(es), and/or other sensor types. In some examples, such as in six-axis applications, the IMU sensor(s) 666 may include accelerometers and gyroscopes, while in nine-axis applications, the IMU sensor(s) 666 may include accelerometers, gyroscopes, and magnetometers.

In some embodiments, the IMU sensor(s) 666 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 666 may enable the vehicle 600 to estimate heading without requiring input from a magnetic sensor by directly observing and correlating the changes in velocity from GPS to the IMU sensor(s) 666. In some examples, the IMU sensor(s) 666 and the GNSS sensor(s) 658 may be combined in a single integrated unit.

The vehicle may include microphone(s) 696 placed in and/or around the vehicle 600. The microphone(s) 696 may be used for emergency vehicle detection and identification, among other things.

The vehicle may further include any number of camera types, including stereo camera(s) 668, wide-view camera(s) 670, infrared camera(s) 672, surround camera(s) 674, long-range and/or mid-range camera(s) 698, and/or other camera types. The cameras may be used to capture image data around an entire periphery of the vehicle 600. The types of cameras used depends on the embodiments and requirements for the vehicle 600, and any combination of camera types may be used to provide the necessary coverage around the vehicle 600. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 6A and FIG. 6B.

The vehicle 600 may further include vibration sensor(s) 642. The vibration sensor(s) 642 may measure vibrations of components of the vehicle, such as the axle(s). For example, changes in vibrations may indicate a change in road surfaces. In another example, when two or more vibration sensors 642 are used, the differences between the vibrations may be used to determine friction or slippage of the road surface (e.g., when the difference in vibration is between a power-driven axle and a freely rotating axle).

The vehicle 600 may include an ADAS system 638. The ADAS system 638 may include a SoC, in some examples. The ADAS system 638 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 660, LIDAR sensor(s) 664, and/or a camera(s). The ACC systems may include longitudinal ACC and/or lateral ACC. Longitudinal ACC monitors and controls the distance to the vehicle immediately ahead of the vehicle 600 and automatically adjust the vehicle speed to maintain a safe distance from vehicles ahead. Lateral ACC performs distance keeping, and advises the vehicle 600 to change lanes when necessary. Lateral ACC is related to other ADAS applications such as LCA and CWS.

CACC uses information from other vehicles that may be received via the network interface 624 and/or the wireless antenna(s) 626 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 600), while the I2V communication concept provides information about traffic further ahead. CACC systems may include either or both I2V and V2V information sources. Given the information of the vehicles ahead of the vehicle 600, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 660, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 660, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 600 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 600 if the vehicle 600 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 660, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 600 is backing up. Some RCTW systems include AEB to ensure that the vehicle brakes are applied to avoid a crash. RCTW systems may use one or more rear-facing RADAR sensor(s) 660, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 600, the vehicle 600 itself must, in the case of conflicting results, decide whether to heed the result from a primary computer or a secondary computer (e.g., a first controller 636 or a second controller 636). For example, in some embodiments, the ADAS system 638 may be a backup and/or secondary computer for providing perception information to a backup computer rationality module. The backup computer rationality monitor may run a redundant diverse software on hardware components to detect faults in perception and dynamic driving tasks. Outputs from the ADAS system 638 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 604.

In other examples, ADAS system 638 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 638 may be fed into the primary computer's perception block and/or the primary computer's dynamic driving task block. For example, if the ADAS system 638 indicates a forward crash warning due to an object immediately ahead, the perception block may use this information when identifying objects. In other examples, the secondary computer may have its own neural network which is trained and thus reduces the risk of false positives, as described herein.

The vehicle 600 may further include the infotainment SoC 630 (e.g., an in-vehicle infotainment system (IVI)). Although illustrated and described as a SoC, the infotainment system may not be a SoC, and may include two or more discrete components. The infotainment SoC 630 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 600. For example, the infotainment SoC 630 may radios, disk players, navigation systems, video players, USB and Bluetooth connectivity, carputers, in-car entertainment, Wi-Fi, steering wheel audio controls, hands free voice control, a heads-up display (HUD), an HMI display 634, a telematics device, a control panel (e.g., for controlling and/or interacting with various components, features, and/or systems), and/or other components. The infotainment SoC 630 may further be used to provide information (e.g., visual and/or audible) to a user(s) of the vehicle, such as information from the ADAS system 638, autonomous driving information such as planned vehicle maneuvers, trajectories, surrounding environment information (e.g., intersection information, vehicle information, road information, etc.), and/or other information.

The infotainment SoC 630 may include GPU functionality. The infotainment SoC 630 may communicate over the bus 602 (e.g., CAN bus, Ethernet, etc.) with other devices, systems, and/or components of the vehicle 600. In some examples, the infotainment SoC 630 may be coupled to a supervisory MCU such that the GPU of the infotainment system may perform some self-driving functions in the event that the primary controller(s) 636 (e.g., the primary and/or backup computers of the vehicle 600) fail. In such an example, the infotainment SoC 630 may put the vehicle 600 into a chauffeur to safe stop mode, as described herein.

The vehicle 600 may further include an instrument cluster 632 (e.g., a digital dash, an electronic instrument cluster, a digital instrument panel, etc.). The instrument cluster 632 may include a controller and/or supercomputer (e.g., a discrete controller or supercomputer). The instrument cluster 632 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 630 and the instrument cluster 632. In other words, the instrument cluster 632 may be included as part of the infotainment SoC 630, or vice versa.

Figure 6D:
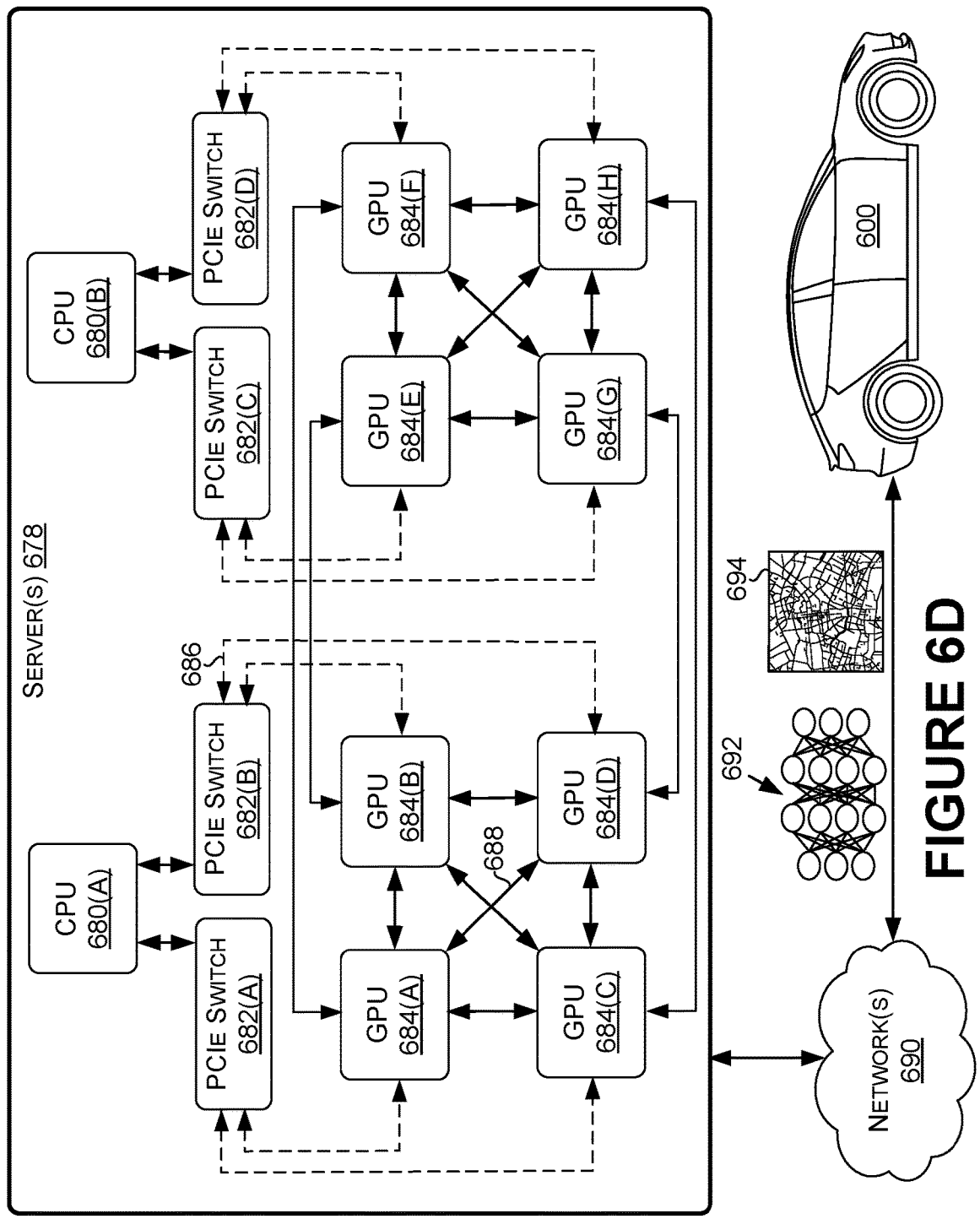
FIG. 6D is a system diagram for communication between cloud-based server(s) and the example autonomous vehicle of FIG. 6A, in accordance with some embodiments of the present disclosure.

FIG. 6D is a system diagram for communication between cloud-based server(s) and the example autonomous vehicle 600 of FIG. 6A, in accordance with some embodiments of the present disclosure. The system 676 may include server(s) 678, network(s) 690, and vehicles, including the vehicle 600. The server(s) 678 may include a plurality of GPUs 684(A)-684(H) (collectively referred to herein as GPUs 684), PCIe switches 682(A)-682(H) (collectively referred to herein as PCIe switches 682), and/or CPUs 680(A)-680(B) (collectively referred to herein as CPUs 680). The GPUs 684, the CPUs 680, and the PCIe switches may be interconnected with high-speed interconnects such as, for example and without limitation, NVLink interfaces 688 developed by NVIDIA and/or PCIe connections 686. In some examples, the GPUs 684 are connected via NVLink and/or NVSwitch SoC and the GPUs 684 and the PCIe switches 682 are connected via PCIe interconnects. Although eight GPUs 684, two CPUs 680, and two PCIe switches are illustrated, this is not intended to be limiting. Depending on the embodiment, each of the server(s) 678 may include any number of GPUs 684, CPUs 680, and/or PCIe switches. For example, the server(s) 678 may each include eight, sixteen, thirty-two, and/or more GPUs 684.

The server(s) 678 may receive, over the network(s) 690 and from the vehicles, image data representative of images showing unexpected or changed road conditions, such as recently commenced road-work. The server(s) 678 may transmit, over the network(s) 690 and to the vehicles, neural networks 692, updated neural networks 692, and/or map information 694, including information regarding traffic and road conditions. The updates to the map information 694 may include updates for the HD map 622, such as information regarding construction sites, potholes, detours, flooding, and/or other obstructions. In some examples, the neural networks 692, the updated neural networks 692, and/or the map information 694 may have resulted from new training and/or experiences represented in data received from any number of vehicles in the environment, and/or based on training performed at a datacenter (e.g., using the server(s) 678 and/or other servers).

The server(s) 678 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 690, and/or the machine learning models may be used by the server(s) 678 to remotely monitor the vehicles.

In some examples, the server(s) 678 may receive data from the vehicles and apply the data to up-to-date real-time neural networks for real-time intelligent inferencing. The server(s) 678 may include deep-learning supercomputers and/or dedicated AI computers powered by GPU(s) 684, such as a DGX and DGX Station machines developed by NVIDIA. However, in some examples, the server(s) 678 may include deep learning infrastructure that use only CPU-powered datacenters.

The deep-learning infrastructure of the server(s) 678 may be capable of fast, real-time inferencing, and may use that capability to evaluate and verify the health of the processors, software, and/or associated hardware in the vehicle 600. For example, the deep-learning infrastructure may receive periodic updates from the vehicle 600, such as a sequence of images and/or objects that the vehicle 600 has located in that sequence of images (e.g., via computer vision and/or other machine learning object classification techniques). The deep-learning infrastructure may run its own neural network to identify the objects and compare them with the objects identified by the vehicle 600 and, if the results do not match and the infrastructure concludes that the AI in the vehicle 600 is malfunctioning, the server(s) 678 may transmit a signal to the vehicle 600 instructing a fail-safe computer of the vehicle 600 to assume control, notify the passengers, and complete a safe parking maneuver.

For inferencing, the server(s) 678 may include the GPU(s) 684 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 7:
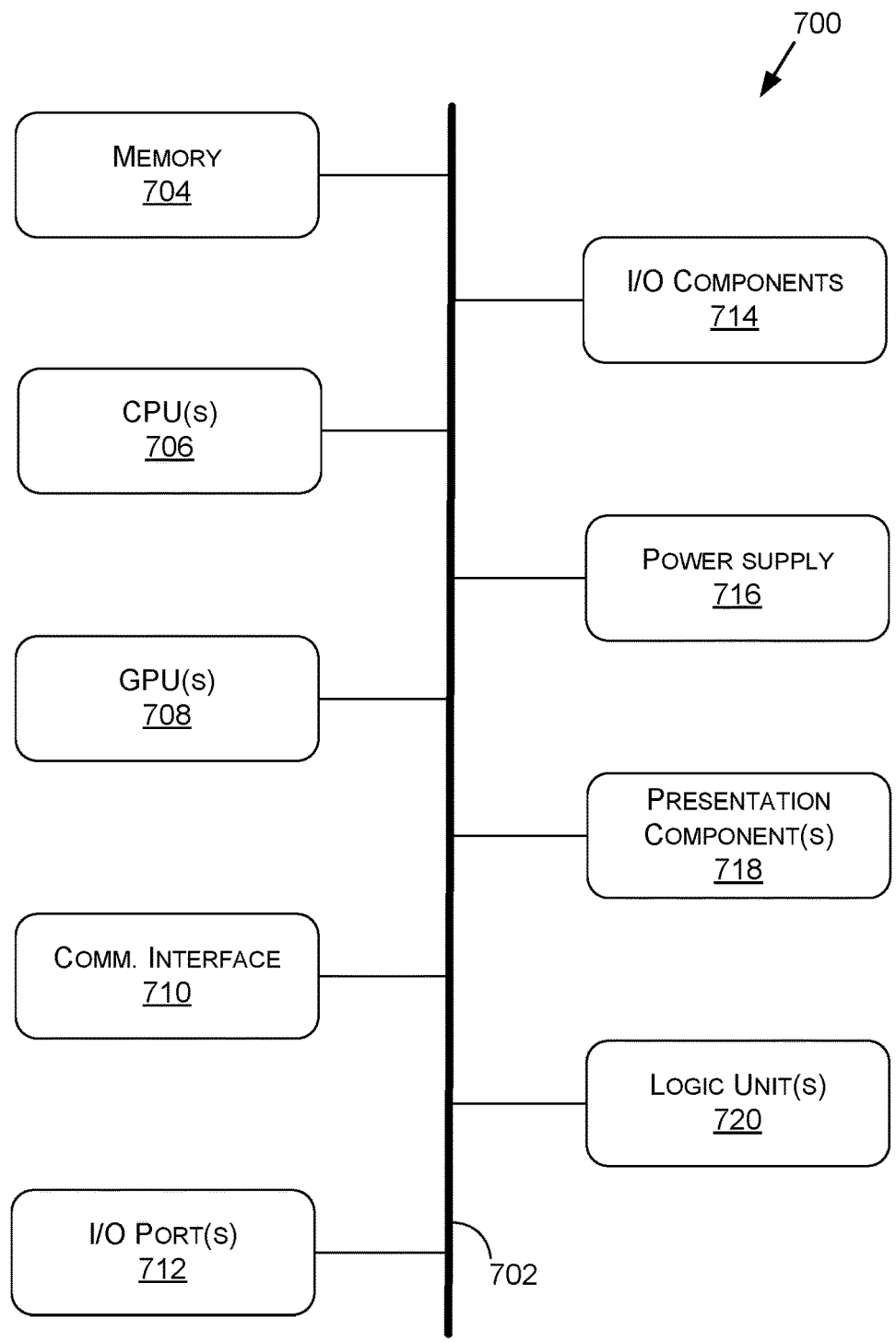
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

Example Data Center

Figure 8:
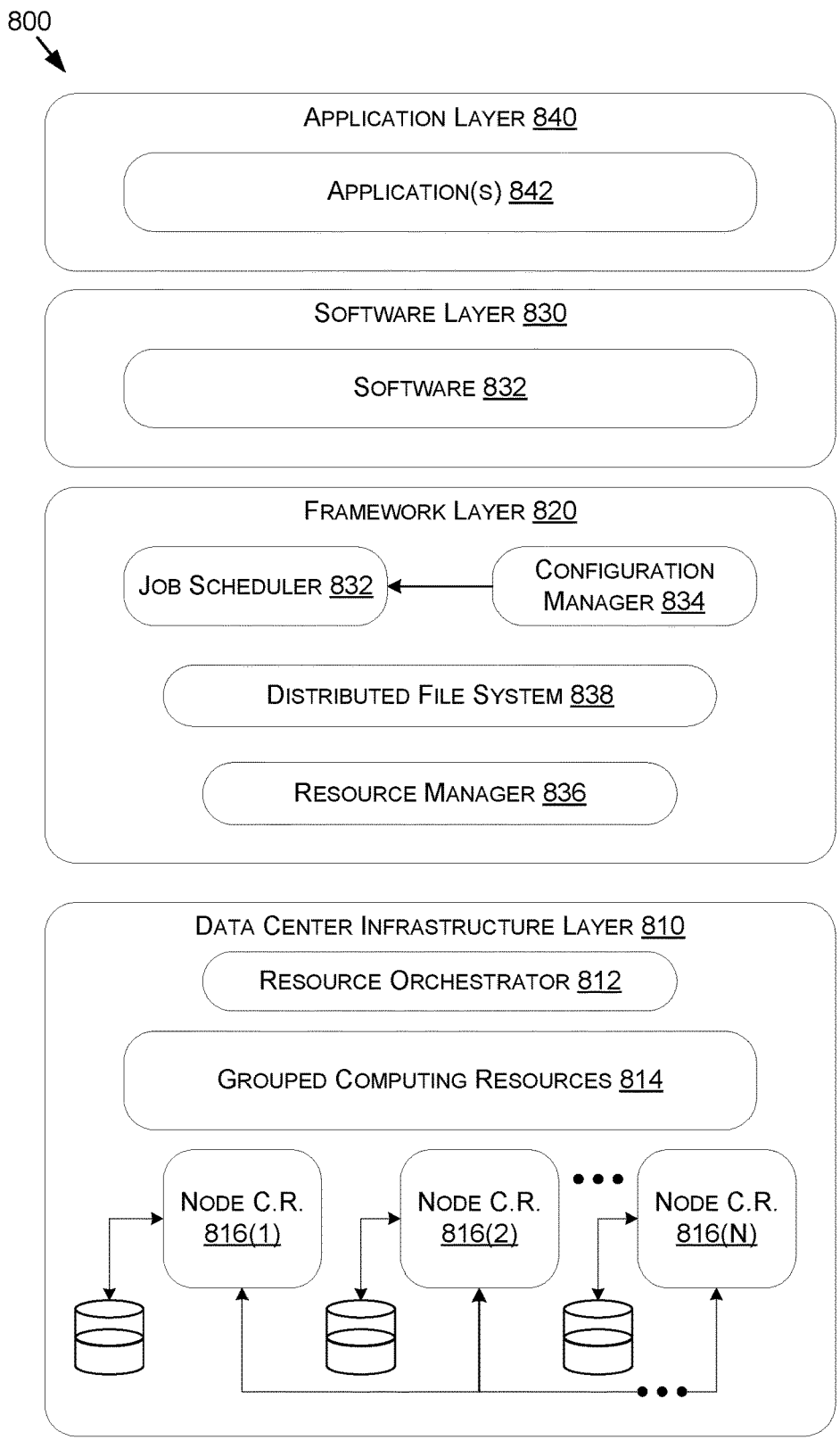
FIG. 8 is a block diagram of an example data center suitable for use in implementing some embodiments of the present disclosure.

FIG. 8 illustrates an example data center 800 that may be used in at least one embodiments of the present disclosure. The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-8161(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, and/or other processors may be grouped within one or more racks to provide compute resources to support one or more workloads. The one or more racks may also include any number of power modules, cooling modules, and/or network switches, in any combination.

The resource orchestrator 822 may configure or otherwise control one or more node C.R.s 816(1)-816(N) and/or grouped computing resources 814. In at least one embodiment, resource orchestrator 822 may include a software design infrastructure ("SDI") management entity for the data center 800. The resource orchestrator 822 may include hardware, software, or some combination thereof.

In at least one embodiment, as shown in FIG. 8, framework layer 820 may include a job scheduler 832, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 832 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 832. In at least one embodiment, clustered or grouped computing resources may include grouped computing resource 814 at data center infrastructure layer 810. The resource manager 1036 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 800. In at least one embodiment, trained or deployed machine learning models corresponding to one or more neural networks may be used to infer or predict information using resources described above with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   computing, using one or more sensors of a vehicle, a location of the vehicle that corresponds to a position within a map of an environment, the map indicating a plurality of features at feature locations in the map;
   determining, based at least on the position within the map, a virtual projection of one or more portions of a field of view associated with a user;
   determining that the virtual projection at least partially intersects, in a coordinate space of the map, at least one physical feature external to the vehicle;
   based at least on the determination that the virtual projection at least partially intersects the at least one physical feature and the at least one physical feature being mapped to one or more of the feature locations for at least one feature of the plurality of features, selecting the at least one feature from the plurality of features;
   based at least on the selecting of the at least one feature, determining one or more content items associated with the at least one feature; and
   causing data associated with the one or more content items to be stored in association with an application.

2. The method of claim 1, wherein an orientation of the virtual projection is based at least on one or more of:
   one or more gaze directions of the user;
   one or more gestures of the user;
   one or more head movements of the user;
   one or more voice inputs from the user; or
   one or more eye movements of the user.

3. The method of claim 1, wherein the determining that the virtual projection at least partially intersects the at least one physical feature includes, based at least on mapping the virtual projection to the coordinate space of the map, comparing the virtual projection to the one or more of the feature locations in the map.

4. The method of claim 1, wherein the determining the virtual projection at least partially intersects the at least one physical feature includes:
   determining a bounding shape location corresponding to the at least one physical feature within the coordinate space;

determining an intersection between at least a portion of a virtual volume corresponding to the virtual projection and the bounding shape location within the coordinate space; and based at least on the determining of the intersection, determining that an amount of overlap between the virtual volume and a bounding shape corresponding to the bounding shape location is greater than a threshold value, wherein the selecting of the at least one feature is based at least on the amount of overlap being greater than the threshold value.

5. The method of claim 1, wherein the causing the data to be stored in association with the application is based at least on determining one or more of:

an amount of overlap between the virtual projection and the at least one physical feature;

an amount of time the virtual projection overlaps with the at least one physical feature; or an actuation, by the user, of a trigger actuator.

6. The method of claim 1, wherein the determining the one or more content items includes:

capturing sensor data using an external sensor of the vehicle, the external sensor including a sensor field of view that includes a point of interest (POI) corresponding to the at least one feature;

analyzing one or more portions of the sensor data that corresponds to the POI; and based at least on the analyzing, determining the one or more content items.

7. The method of claim 1, wherein the selecting is further based at least on receiving user input indicating a selection of the at least one feature while the virtual projection at least partially intersects the at least one physical feature.

8. A system comprising:

one or more processing units to execute operations including:

determining, using one or more sensors of a vehicle, a location of the vehicle that corresponds to a position within a map of an environment, the map indicating a plurality of features at feature locations in the map;

identifying, based at least on the position within the map, a virtual projection of one or more portions of a field of view associated with a user;

determining that the virtual projection at least partially overlaps, in a coordinate space of the map, at least one physical feature external to the vehicle;

based at least on the identifying and the at least one physical feature being mapped to one or more of the feature locations for at least one feature of the plurality of features, selecting the at least one feature from the plurality of features;

based at least on the selecting of the at least one feature, determining one or more content items associated with the at least one feature; and causing data associated with the one or more content items to be stored in association with an application.

9. The system of claim 8, wherein an orientation of the virtual projection is based at least on one or more of:

one or more gaze directions of the user;

one or more gestures of the user;

one or more head movements of the user;

one or more voice inputs from the user; or one or more eye movements of the user.

10. The system of claim 8, wherein the one or more of the feature locations correspond to at least a portion of a virtual indicator of a point of interest (PoI) and the one or more content items are associated with the PoI.

11. The system of claim 8, wherein the determining that the virtual projection at least partially overlaps includes:

determining a bounding shape location corresponding to the at least one physical feature within the coordinate space; and determining an overlap between the virtual projection and the bounding shape location within the coordinate space.

12. The system of claim 8, wherein the causing the data to be stored in association with the application is based at least on determining one or more of:

an amount of overlap between the virtual projection and the at least one physical feature;

an amount of time the virtual projection overlaps with the at least one physical feature; or an actuation, by the user, of a trigger actuator.

13. The system of claim 8, wherein the determining the one or more content items includes:

capturing sensor data using an external sensor of the vehicle, the external sensor including a sensor field of view that includes a point of interest (POI) corresponding to the at least one feature;

analyzing one or more portions of the sensor data that corresponds to the POI; and based at least on the analyzing, determining the one or more content items.

14. The system of claim 8, wherein an overlap between the virtual projection and the at least one physical feature is identified in the coordinate space of the map using a mapping of the virtual projection to the coordinate space.

15. At least one processor comprising:

one or more circuits to cause data associated with one or more content items corresponding to at least one feature of a plurality of features indicated at feature locations in a map of an environment to be stored in association with an application based at least on:

a location of a vehicle that corresponds to a position within the map being computed using one or more sensors of a vehicle, based at least on the position within the map, a first determination of a virtual projection of one or more portions of a field of view associated with a user, a second determination that the virtual projection at least partially intersects, in a coordinate space of the map, at least one physical feature external to the vehicle, and a selection of the at least one feature from the plurality of features based at least on the second determination and the at least one physical feature being mapped to one or more of the feature locations for the at least one feature.

16. The processor of claim 15, wherein an orientation of the virtual projection is based at least on one or more of:

one or more gaze directions of the user;

one or more gestures of the user;

one or more head movements of the user;

one or more voice inputs from the user; or one or more eye movements of the user.

17. The processor of claim 15, wherein the at least one feature corresponds to at least a portion of a virtual indicator of a point of interest (PoI) and the one or more content items are associated with the PoI.

18. The processor of claim 15, wherein the second determination is based at least on:

determining a bounding shape location corresponding to the at least one physical feature within the coordinate space; and determining an overlap between the virtual projection and the bounding shape location within the coordinate space.

19. The processor of claim 15, wherein the causing the data to be stored in association with the application is based at least on one or more of:
an amount of overlap between the virtual projection and the at least one physical feature;
an amount of time the virtual projection overlaps with the at least one physical feature; or
an actuation, by the user, of a trigger actuator.

20. The processor of claim 15, wherein the virtual projection is identified in the coordinate space of the map using a mapping of the virtual projection to the coordinate space.

* * * * *